(12) United States Patent
Tour et al.

(10) Patent No.: US 7,939,047 B2
(45) Date of Patent: May 10, 2011

(54) BULK SEPARATION OF CARBON NANOTUBES BY BANDGAP

(75) Inventors: James M. Tour, Bellaire, TX (US); Christopher A. Dyke, Humble, TX (US); Austen K. Flatt, Houston, TX (US)

(73) Assignee: William Marsh Rice University, Houston, TX (US)

( * ) Notice: Subject to any disclaimer, the term of this patent is extended or adjusted under 35 U.S.C. 154(b) by 738 days.

(21) Appl. No.: 11/572,891

(22) PCT Filed: Jul. 27, 2005

(86) PCT No.: PCT/US2005/026648
§ 371 (c)(1),
(2), (4) Date: Jan. 29, 2008

(87) PCT Pub. No.: WO2006/096200
PCT Pub. Date: Sep. 14, 2006

(65) Prior Publication Data
US 2008/0260616 A1    Oct. 23, 2008

Related U.S. Application Data

(60) Provisional application No. 60/592,313, filed on Jul. 29, 2004.

(51) Int. Cl.
*C01B 31/02*    (2006.01)

(52) U.S. Cl. ............ 423/460; 209/1; 210/635; 210/638; 210/639; 210/656; 423/461; 977/745; 977/748; 977/751; 977/845; 977/847

(58) Field of Classification Search ............... 210/634, 210/635, 638, 639, 656, 702, 806; 209/1, 209/155; 204/554, 558, 563; 423/445 R, 423/447.1–447.3, 460, 461, 445 B; 428/367; 977/742–754, 842–848
See application file for complete search history.

(56) References Cited

U.S. PATENT DOCUMENTS

| | | | | |
|---|---|---|---|---|
| 4,019,372 | A * | 4/1977 | Parkell et al. | 73/61.57 |
| 6,749,756 | B1 * | 6/2004 | Curran et al. | 506/41 |
| 7,074,310 | B2 * | 7/2006 | Smalley et al. | 204/450 |
| 7,488,876 | B2 * | 2/2009 | Jung et al. | 423/445 B |
| 2003/0168385 | A1 * | 9/2003 | Papadimitrakopoulos | 209/1 |
| 2004/0040834 | A1 * | 3/2004 | Smalley et al. | 204/164 |
| 2004/0232073 | A1 * | 11/2004 | Papadimitrakopoulos | 210/634 |

OTHER PUBLICATIONS

Strano et al, "Electronic Structure Control of Single-Walled Carbon Nanotube Functionalization", Sep. 12, 2003, Science, vol. 301, pp. 1519-1522, downloaded from the internet Aug. 6, 2010.*

(Continued)

*Primary Examiner* — Joseph W Drodge
(74) *Attorney, Agent, or Firm* — Winstead PC

(57) ABSTRACT

The present invention is directed to methods of separating carbon nanotubes (CNTs) by their electronic type (e.g., metallic, semi-metallic, and semiconducting). Perhaps most generally, in some embodiments, the present invention is directed to methods of separating CNTs by bandgap, wherein such separation is effected by interacting the CNTs with a surface such that the surface interacts differentially with the CNTs on the basis of their bandgap, or lack thereof. In some embodiments, such methods can allow for such separations to be carried out in bulk quantities.

51 Claims, 29 Drawing Sheets

OTHER PUBLICATIONS

Maeda et al, "Large-Scale Separation of Metallic and Semiconducting Single-Walled Carbon Nanotubes", Jul. 1, 2005, Journal of American Chemical Society, vol. 127, pp. 10287-10290, downloaded from the internet Aug. 6, 2010.*

Burghard et al, "Chemically Functionalized Carbon Nanotubes", Small, vol. 1, No. 2, pp. 180-192, downloaded from the internet Aug. 6, 2010.*

Chattopadhyay et al, "A Route for Bulk Separation of Semiconducting from Metallic Single-Wall Carbon Nanotubes", 2003, Journal of American Chemical Society, vol. 125 of 2003, pp. 3370-3375, downloaded from the internet Aug. 6, 2010.*

Jeffrey L. Bahr et al Functionalization of Carbon Nanotubes by Electrochemical Reduction of Aryl Diazonium Salts: A Bucky Paper Electrode, J. Am. Chem. Soc., 2001, vol. 123, pp. 6536-6542, Published Jun. 14, 2001, downloaded from the Internet Dec. 21, 2010.*

* cited by examiner

Scheme 1

Scheme 2

Scheme 3

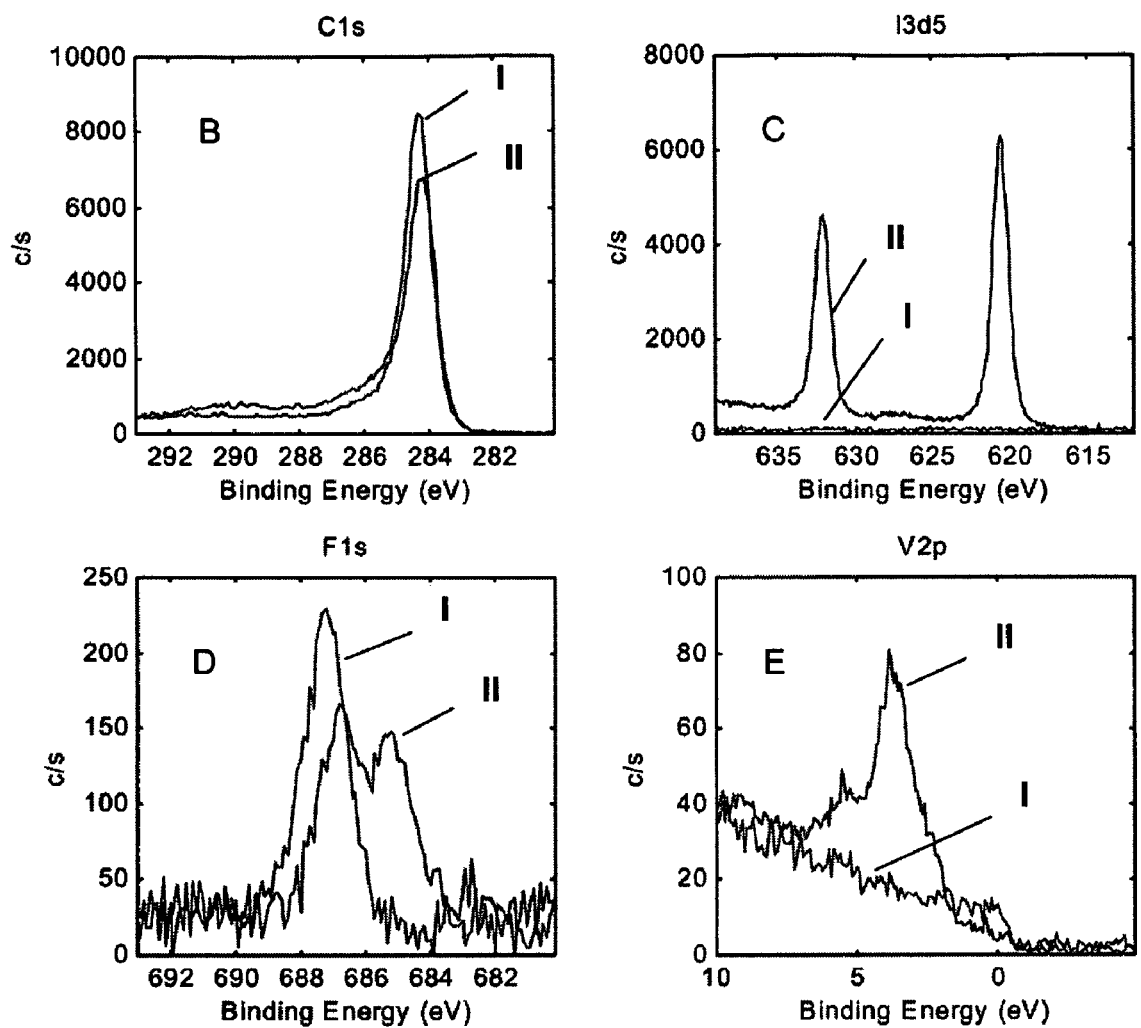
Fig. 10 (con't.)

| Excitation Wavelength | Raman Spectra of Starting SWNTs | Raman Spectra of SWNTs from Separation Method I, Nonpolar Fraction | Raman Spectra of SWNTs from Separation Method II, Nonpolar Fraction |
|---|---|---|---|
| 633 nm | From Fig. 13. | From Fig. 17 inset. | From Fig. 23. |
| 514 nm | From Fig 14. | From Fig. 18 inset. | From Fig. 24. |
| 780 nm | From Fig 15. | From Fig. 19 inset. | From Fig 25 inset. |

Fig. 29

BULK SEPARATION OF CARBON NANOTUBES BY BANDGAP

CROSS-REFERENCE TO RELATED APPLICATIONS

This application is a national phase application of PCT/US2005/026648, entitled "Bulk Separation of Carbon Nanotubes by Bandgap", filed on Jul. 27, 2005 and claiming priority to and benefit of U.S. Provisional Patent Application Ser. No. 60/592,313, filed Jul. 29, 2004.

The present invention was made with government support under Grant Nos. JSC-NCC-9-77 and URETI NCC-01-0203, both awarded by the National Aeronautics and Space Administration; Grant No. NSR-DMR-0073046, awarded by the National Science Foundation; and Grant No. F49620-01-1-0364, awarded by the United States Air Force. The government has certain rights in the invention.

FIELD OF THE INVENTION

The present invention relates generally to carbon nanotubes. More specifically, the invention relates to bulk separation methods for separating carbon nanotubes by electronic type.

BACKGROUND OF THE INVENTION

Carbon nanotubes (CNTs), comprising multiple concentric shells and termed multi-wall carbon nanotubes (MWNTs), were discovered by Iijima in 1991 (Iijima, *Nature* 1991, 354, 56). Subsequent to this discovery, single-wall carbon nanotubes (SWNTs), comprising a single graphene rolled up on itself, were synthesized in an arc-discharge process using carbon electrodes doped with transition metals (Iijima et al., *Nature* 1993, 363, 603; and Bethune et al., *Nature* 1993, 363, 605). These carbon nanotubes (especially SWNTs) possess unique mechanical, electrical, thermal and optical properties, and such properties make them attractive for a wide variety of applications. See Baughman et al., *Science*, 2002, 297, 787-792.

The diameter and chirality of CNTs are described by integers "n" and "m," where (n,m) is a vector along a graphene sheet which is conceptually rolled up to form a tube. When $n-m=3q$, where q is an integer, the CNT is a semi-metal. When $n-m=0$, the CNT is truly metallic in its behavior and referred to as an "armchair" nanotube. All other combinations of n–m are semiconducting CNTs with bandgaps in the range of 0.5 to 1.5 eV (0.8-1.4 eV for HiPco® SWNTS). See O'Connell et al., *Science*, 2002, 297, 593. CNT "type," as used herein, refers to such electronic types described by the (n,m) vector (i.e., metallic, semi-metallic, and semiconducting).

The main hurdle to the widespread application of CNTs, and SWNTs in particular, is their manipulation according to electronic structure (Avouris, *Acc. Chem. Res.* 2002, 35, 1026-1034). All known preparative methods lead to polydisperse materials of semiconducting, semimetallic, and metallic electronic types. See M. S. Dresselhaus, G. Dresselhaus, P. C. Eklund, *Science of Fullerenes and Carbon Nanotubes*, Academic Press, San Diego, 1996; Bronikowski et al., *Journal of Vacuum Science & Technology* 2001, 19, 1800-1805; R. Saito, G. Dresselhaus, M. S. Dresselhaus, *Physical Properties of Carbon Nanotubes*, Imperial College Press, London, 1998. Recent advances in the solution phase dispersion (Strano et al., *J. Nanosci. and Nanotech.*, 2003, 3, 81; O'Connell et al., *Science*, 2002, 297, 593-596) along with spectroscopic identification using bandgap fluorescence (Bachilo et al., *Science*, 2002, 298, 2361) and Raman spectroscopy (Strano, *Nanoletters* 2003, 3, 1091) have greatly improved the ability to monitor electrically distinct nanotubes as suspended mixtures and have led to definitive assignments of the optical features of semiconducting (Bachilo et al., *Science*, 2002), as well as metallic and semi-metallic species (Strano, *Nanoletters*, 2003).

Techniques of chemically functionalizing CNTs have greatly facilitated the ability to manipulate these materials, particularly for SWNTs which tend to assemble into rope-like aggregates (Thess et al., *Science*, 1996, 273, 483-487). Such chemical functionalization of CNTs is generally divided into two types: tube end functionalization (Chen et al., *Science*, 1998, 282, 95-98), and sidewall functionalization (PCT publication WO 02/060812 by Tour et al.).

While separation of CNTs by electronic type has been reported (Smalley et al., PCT Publication No. WO 03/084869 A2; Krupke et al., *Science*, 2003, 301, 344-347), such methods do not appear to be amenable to scale-up. It would be extremely useful to have a separation technique that affords such separation on a bulk scale, particularly wherein such a technique additionally possesses the operational flexibility afforded it by selective functionalization.

BRIEF DESCRIPTION OF THE INVENTION

The present invention is directed to methods of separating carbon nanotubes (CNTs) by their electronic type (e.g., metallic, semi-metallic, and semiconducting). Perhaps most generally, in some embodiments, the present invention is directed to methods of separating CNTs by bandgap, wherein such separation is effected by interacting the CNTs with a surface such that the surface interacts differentially with the CNTs on the basis of their bandgap (or lack thereof), or appendages to the CNT sidewalls which were placed there based upon the original nanotube bandgaps. In some embodiments, such methods permit such separations to be carried out in bulk quantities.

In some embodiments, such above-described methods rely on the differential reactivity of CNTs of different electronic type toward one or more reactive species (i.e., functionalization). Once differentially functionalized, the CNTs of different electronic type are typically separated via chromatographic means. Depending on the degree of separation a particular embodiment affords, such separation can lead to product that is enriched in a particular electronic type, or to product that comprises an isolated type. In some embodiments, such reactive species are diazonium species. In some embodiments, such diazonium species are used to functionalize, in a stepwise fashion, CNTs of different electronic type with functional moieties imparting differing solubility to the different CNT types.

In some embodiments, methods of the present invention comprise the steps of: individually dispersing CNTs in an aqueous surfactant solution to form a first dispersion; generating either heavily-functionalized or selectively-functionalized CNT material via functionalization with diazonium species to yield differentially-functionalized CNTs; collecting and optionally purifying the differentially-functionalized CNTs; dispersing the differentially-functionalized CNTs in an appropriate organic solvent to form a second dispersion; and performing a chromatographic separation (e.g., flash chromatography) on the second dispersion, wherein fractions are collected at different elution times to complete the separation.

Numerous variations and embodiments fall within the scope of the present invention. For example, the kind of CNTs, the functionalization methodology, the functional groups being attached to the CNTs, and the CNT concentrations can all be varied. For chromatographic separations, the stationary phase can be varied or the mobile phase can be varied. In some embodiments, instead of bulk separation, the functional groups placed selectively on the metal CNTs can be such that only the metal CNTs undergo a treatment selected from the group consisting of assembly onto a surface; attachment to a dense, large object; attachment to an enzyme; made basic or acidic; made water soluble; are chelated; made recognizable by a guest; tagged with a receptor; and combinations thereof.

The utility of the present invention resides in the fact that it provides a means of extracting and/or concentrating metallic, semi-metallic, or semiconducting CNTs from bulk nanotube samples, the bulk material generally comprising a mixture of these species. These materials can then be used as seeds to further produce a particular type of nanotube, place a particular type of nanotube in a device, generate multifunctional materials, make sensing elements, etc.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIGS. 10A-10E depicts XPS analysis of the iterative functionalization products (aryl fluoride then aryl iodide as shown in Scheme 3), showing both the fluorinated material (Trace I), and the fluoroaromatic-grafted material that was treated with 4-iodobenzenediazonium tetrafluoroborate (Trace II) after the van Hove transitions were lost in the UV/Vis/NIR spectrum, where XPS spectra were obtained at a 75° takeoff angle and 23.5 eV pass energy, and where the XPS analysis consisted of (A) survey of the spectral region from 0 to 1400 eV, (B) the carbon 1 s region, (C) the iodine 3d5 region showing a strong presence of iodophenyl groups in the sample treated with 4-iodobenzenediazonium tetrafluoroborate, (D) the fluorine is region showing a slight decrease in the concentration and chemical state of the grafted fluorophenyl groups, and (E) the valence region showing a signal for iodine 5p at 3.5 eV only in the iodophenyl-grafted sample;

FIG. 29 is a comparison chart of the Raman spectra at varying wavelengths of the starting SWNT (left column, prepared from the SDS/SWNTs by flocculation with acetone), the regenerated (TGA pan) SWNTs from Separation Method I (middle column) and Separation Method II (right column);

DETAILED DESCRIPTION OF THE INVENTION

Figure 1:
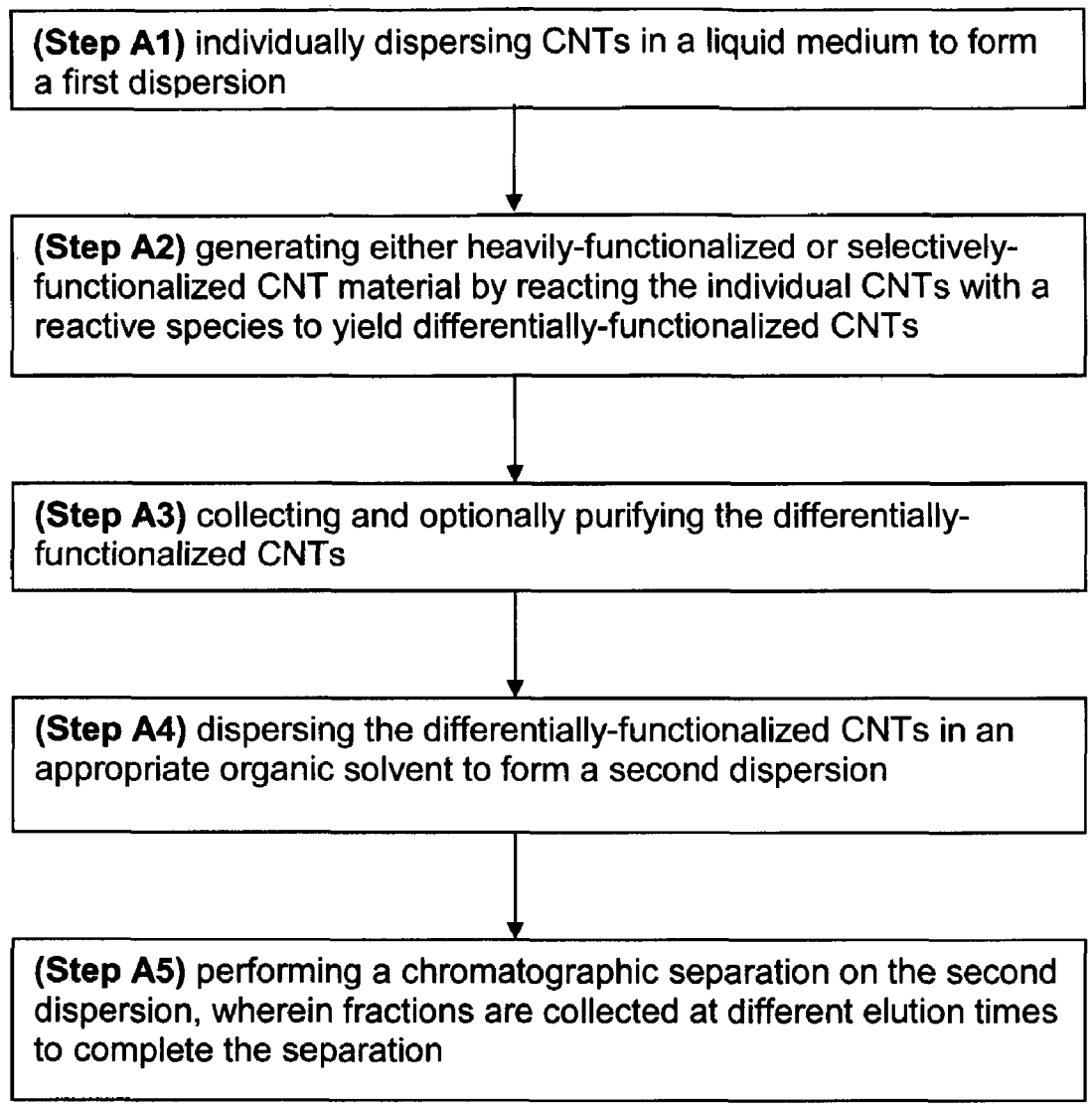
FIG. 1 depicts, in stepwise fashion, a method of separating CNTs by type, in accordance with some embodiments of the present invention.

The present invention is directed to methods of separating carbon nanotubes (CNTs) by their electronic type (e.g., metallic, semi-metallic, and semiconducting). Perhaps most generally, in some embodiments, the present invention is directed to methods of separating CNTs by bandgap, wherein such separation is effected by interacting the CNTs with a surface such that the surface interacts differentially with the CNTs on the basis of their bandgap, or lack thereof. In some embodiments, such methods allow for such separations to be carried out in bulk quantities. Depending on the degree of separation a particular embodiment affords, such separation can lead to product that is enriched in a particular electronic type, or to product that comprises an isolated type.

In some embodiments, the present invention provides CNTs of a particular type or concentrations of types from as-prepared nanotube mixtures. For a discussion on manipulating carbon nanotubes by type, see Strano et al., *Science* 2003, 301, 1519. For a discussion of the composition of a nanotube mixture, see Bachilo et al., *Science* 2002, 298, 2361; Weisman et al., *Nano Lett.,* 2003, 3, 1235.

In some of the above-mentioned embodiments, CNTs are first dispersed individually in a solvent, typically with the aid of either a dispersal agent such as, but not limited to, ionic surfactants (e.g., sodium dodecyl sulfate), non-ionic surfactants (e.g., pluronics, Triton-x®), polymer species, and combinations thereof; and/or functionalization The individually-dispersed CNTs are then interacted with at least one surface while in this dispersed state. Such interacting between the dispersed CNTs and the at least one surface can include, but is not limited to, covalent bonding, electrostatic interactions, hydrogen bonding, van der Waals attractive forces, and combinations thereof. In some such embodiments, interaction between the CNTs and the surface is provided for, or enhanced by, functionalization of the CNTs and/or the surface. Such functionalization can involve covalently attaching moieties to either or both of the CNTs and the surface. Additionally or alternatively, such functionalization can be of a non-covalent nature involving the use of such things as surfactants, polymer wrapping species, protons, and the like—dependent upon the interaction of such species with the CNT, and whether or not such interaction is differential. See O'Connell et al., *Chem. Phys. Lett.*, 2001, 342, 265.

While not intending to limit the scope of the present invention, the at least one surface employed in such above-described separations is typically associated with a chromatographic device. In some such embodiments, a chromatographic stationary phase, which may be functionalized itself, interacts differentially with the individualized CNTs—which may or not be functionalized themselves. In some such embodiments, the stationary phase interacts directly with the individualized (e.g., surfactant wrapped) CNTs on the basis of their bandgap. In some or other such embodiments, the stationary phase interacts with the dispersal agent still associated with the individualized CNTs, wherein such CNTs have been differentially dispersed. In some or other such embodiments, the stationary phase interacts with functional moieties on the CNTs, such CNTs having been differentially functionalized on the basis of their bandgap. Regardless, the interaction can result in a separation of CNTs by type. In some embodiments, wherein differential functionalization is employed, such functionalization can be removed by thermolysis. See, e.g., Bahr et al., *J. Am. Chem. Soc.*, 2001, 123, 6536.

Referring to FIG. 1, in some embodiments, methods of the present invention comprise the steps of: (Step A1) individually dispersing CNTs in a liquid medium (e.g., an aqueous surfactant solution) to form a first dispersion; (Step A2) generating either heavily-functionalized or selectively-functionalized CNT material by reacting the individual CNTs with a reactive species to yield differentially-functionalized CNTs; (Step A3) collecting and optionally purifying the differentially-functionalized CNTs; (Step A4) dispersing the differentially-functionalized CNTs in an appropriate organic solvent to form a second dispersion; and (Step 5) performing a chromatographic separation (e.g., flash chromatography) on the second dispersion, wherein fractions are collected at different elution times to complete the separation.

Generally, any method of dispersing CNTs as individual CNTs will suffice in the above-described Step A1. Suitable methods include, but are not limited to, surfactant assisted suspensions, polymer wrapping, suspension in superacid media, and combinations thereof. Typically, the reactive specie(s) comprises a diazonium species, but it is by no means limited to these species. In some embodiments, the functionalization method conveys dispersability and/or vice versa, i.e., a dispersal agent can impart non-covalent functionalization (e.g., polymer wrapping).

In some embodiments, methods of the present invention comprising selective-functionalization comprise the steps of: (Step B1) dispersing a mixture of CNTs of different type individually; (Step B2) selectively functionalizing metallic and semi-metallic CNTs within the mixture using a first diazonium species, in sub-stoichiometric amount, to yield a first mixture comprising selectively-functionalized metallic and semi-metallic CNTs and unfunctionalized semiconducting CNTs; (Step B3) reacting all of the CNTs in the first mixture with a second diazonium species to yield a second mixture comprising differentially-functionalized metallic and semi-metallic CNTs possessing a first chemical property and functionalized semiconducting CNTs possessing a second chemical property; (Step B4) performing at least one chromatographic separation on the second mixture, so as to separate the differentially-functionalized metallic and semi-metallic CNTs from the functionalized semiconducting CNTs on the basis of their functionalization-induced differential chemical properties. In some or other embodiments, step d could be supplemented or substituted with another bulk purification method such as extraction of the hydroxyl-functionalized metallic and semi-metallic CNTs into a hydrophilic phase while the semiconductors would remain in a hydrophobic phase. The first and second chemical properties, described above, can be differentiated on the basis of polarity, charge, solubility, crystallizability, electronegativity, and the like; or, generally, as a preference for the chromatographic stationary phase or mobile phase.

In some embodiments, methods of the present invention comprising heavy-functionalization comprise the steps of: (Step C1) dispersing a mixture of CNTs of different type individually in a solvent; (Step C2) differentially-functionalizing the mixture of CNTs with at least one diazonium species to form a mixture comprising functionalized metallic and semi-metallic CNTs and functionalized semiconducting CNTs, wherein the functionalized metallic and semi-metallic CNTs within the mixture comprise a functionalization-induced chemical property that is chemically distinct from that of the functionalized semiconducting CNTs within the mixture; and (Step C3) chromatographically-separating the functionalized metallic and semi-metallic CNTs from the functionalized semiconducting CNTs on the basis of this chemical property.

"Carbon nanotubes" (CNTs), according to the present invention, include, but are not limited to, single-wall carbon nanotubes (SWNTs), multi-wall carbon nanotubes (MWNTs), double-wall carbon nanotubes (DWNTs), buckytubes, small-diameter carbon nanotubes, fullerene tubes, tubular fullerenes, graphite fibrils, and combinations thereof. Such carbon nanotubes can be of a variety and range of lengths, diameters, number of tube walls, chiralities (helicities), etc., and can be made by any known technique including, but not limited to, arc discharge [Ebbesen, *Annu. Rev. Mater. Sci.* 1994, 24, 235-264], laser oven (Thess et al., *Science* 1996, 273, 483-487], flame synthesis (Vander Wal et al., *Chem. Phys. Lett.* 2001, 349, 178-184], chemical vapor deposition (U.S. Pat. No. 5,374,415], wherein a supported (Hafner et al., *Chem. Phys. Lett.* 1998, 296, 195-202] or an unsupported (Cheng et al., *Chem. Phys. Lett.* 1998, 289, 602-610; Nikolaev et al., *Chem. Phys. Lett.* 1999, 313, 91-97] metal catalyst may also be used, and combinations thereof. Depending on the embodiment, the CNTs can be subjected to one or more processing steps. In some embodiments, the CNTs have been purified. Exemplary purification techniques include, but are not limited to, those by Chiang et al. (Chiang et al., *J. Phys. Chem. B* 2001, 105, 1157-1161; Chiang et al., *J. Phys. Chem. B* 2001, 105, 8297-8301]. In some embodiments, the CNTs have been cut by a cutting process. See, e.g., Liu et al., *Science* 1998, 280, 1253-1256; and Gu et al., *Nano Lett.* 2002, 2(9), 1009-1013. The terms "carbon nanotube" and "nanotube" are used interchangeably herein.

"Individualized CNTs," according to the present invention, are CNTs that have been debundled such that they are not in direct van der Waals contact with one another—as they would be in a CNT rope or bundle, and which are typically described as being "individually dispersed" when in a solvent.

"Surfactants," according to the present invention, can be any chemical agent which facilitates the dispersion of carbon nanotubes in water (or possibly other solvent). Surfactants include, but are not limited to, ionic surfactants, non-ionic surfactants, cationic surfactants, anionic surfactants, sodium dodecyl sulfate (SDS), sodium dodecylbenzene sulfonate (SDBS), sodium octylbenzene sulfonate, TRITON X-100, dodecyltrimethylammonium bromide (DTAB), and combinations thereof. However, in some embodiments, organically-wrapped CNTs in an organic solvent could also be partners in the reaction with diazonium species in a selective coupling, provided the wrapped species are single nanotubes, or small bundles thereof, i.e., on the order of 2-3 nanotubes, such that the individual nanotubes are accessible for the selective functionalization process.

"Differentially-functionalized," according to the present invention, refers to selectively functionalizing CNTs within a mixture with chemical moieties of differing chemical properties (e.g., affinity for polar solvents), such that the CNTs of differing electronic type are imparted with different chemical properties when functionalized.

"Separation," as defined herein, generally refers to a concentrating of one type of CNT within a mixture. The extent of such separation determines whether the products are still mixtures in which one type of CNT dominates, or whether a population of CNTs of particular type are truly isolated. Separation does not necessarily imply a near-homogeneous single nanotube type (n,m), with an infinitesimal amount of other nanotube types, but merely an enrichment of one nanotube type beyond that originally determined in the starting sample of nanotube types.

In some of the above-described embodiments, the step of forming an aqueous mixture of surfactant-suspended carbon nanotubes comprises a homogenizing step. A homogenizing step, according to the present invention, can be any method which suitably homogenizes the mixture and renders at least some of the carbon nanotubes encapsulated in micellar-like assemblies.

In some of the above-described embodiments, the step of forming an aqueous mixture of surfactant-suspended carbon nanotubes further comprises ultrasonic assistance. Ultrasonic assistance can be provided by either an ultrasonic bath or an ultrasonic horn sonicator, typically operating at a power from between about 200 W to about 600 W. The duration of such ultrasonic assistance typically ranges from about 1 min to about 20 min.

In some of the above-described embodiments, the mixture of surfactant-suspended carbon nanotubes is centrifuged to separate the surfactant-suspended nanotube material from other material. In such embodiments, the other material gravitates to the bottom and the surfactant-suspended carbon nanotubes are decanted. In some such embodiments, the centrifugation is provided by an ultracentrifuge, and centrifugation is performed with an intensity which ranges generally from about 10,000 rpm to about 90,000 rpm, and for a duration which ranges generally from about 1 hour to about 6 hour. See O'Connell et al., *Science,* 2002, 297, 593.

In some of the above-described embodiments, wherein diazonium species are emploed as the reactive species, aryl diazonium salts are used as the diazonium species. Suitable aryl diazonium salts include, but are not limited to,

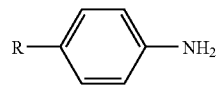

where R is selected from the group consisting of halogen, nitro, cyano, alkyl, aryl, arylalkyl, hydroxy, carboxylic ester, carboxylic acid, thiocarbonate, amine, amide, alkoxy, polyether, polyalkyl, hydroxy alkyl, and combinations thereof. Variations for "R" include: a) aliphatic chains or groups for nonpolar solvent solubility; b) polystyrene, polyethylene, polypropylene, etc. for incorporation into composites or blends; c) electrically-conducting polymeric substituents (i.e., polypyrrole or poly(phenylene vinylene)); d) polyether chain to increase water or alcohol solubility; e) carboxylic acid or carboxylate anion to increase water solubility; f) substituents that can cross-link polymers to form composites; g) R can be substituted at various positions on the aromatic ring (ortho, meta, para); h) there are multiple "R" groups; and, when present, use of Cl, Br, and I as leaving groups to attach to a metal surface or nanoparticle.

In some of the above-described embodiments, the aryl diazonium salt is first solubilized in water or another solvent, prior to adding it to the mixture of surfactant-suspended carbon nanotubes, and allowing it to react with the nanotubes. In such embodiments, a substoichiometric amount of the aryidiazonium salt is added such that it reacts preferentially with the metallic (no bandgap) and semi-metallic ("Mod 3" nanotubes (where n−m=multiple of 3 and the bandgap is on the order of milli electron volts) possessing a very small bandgap, sometimes referred to as a "pseudo-gap," that is curvature induced) carbon nanotubes, but not with the semiconducting carbon nanotubes.

In some embodiments of the present invention, Raman, absorption, and/or fluorescence spectroscopies are used to used to analyze the process during and/or after reaction to indicate that the reaction between CNTs and reactive species is selective—e.g., favoring reaction of metallic and semi-metallic nanotubes first.

In some embodiments, wherein diazonium species are employed as the reactive species, the diazonium species is generated in situ by reacting a substituted aniline species with an alkyl nitrite (or alternatively an inorganic nitrite in the presence of an acid). Substituted aniline species, according to the present invention, have the general formula

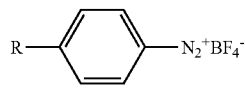

where R (the substituent, or substituents in the case of multiple substitutions) is selected from the group consisting of halogen, nitro, cyano, alkyl, aryl, arylalkyl, hydroxy, carboxylic ester, carboxylic acid, thiocarbonate, amide, alkoxy, polyether, polyalkyl, hydroxyl alkyl, and combinations thereof.

In some embodiments, wherein diazonium species are employed as the reactive species, the diazonium species is generated from a triazene and an acid. In some or other such embodiments, the diazonium species is a bis-diazonium species.

Figure 2:
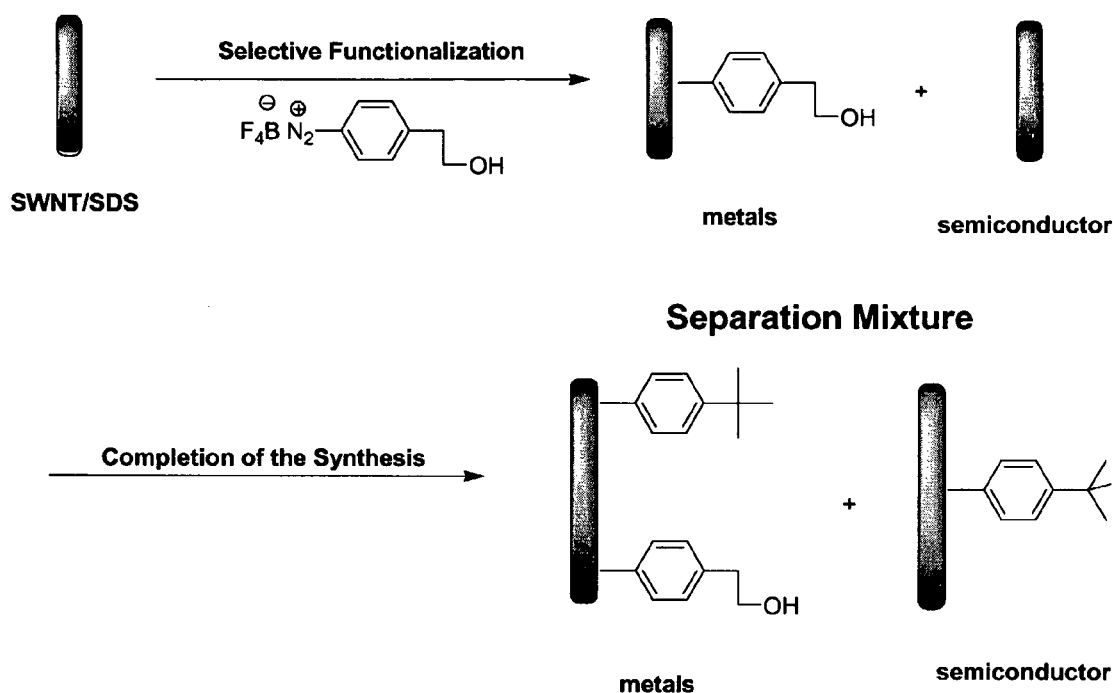
FIG. 2 depicts a reaction scheme in accordance with some embodiments of the present invention.
Figure 3:
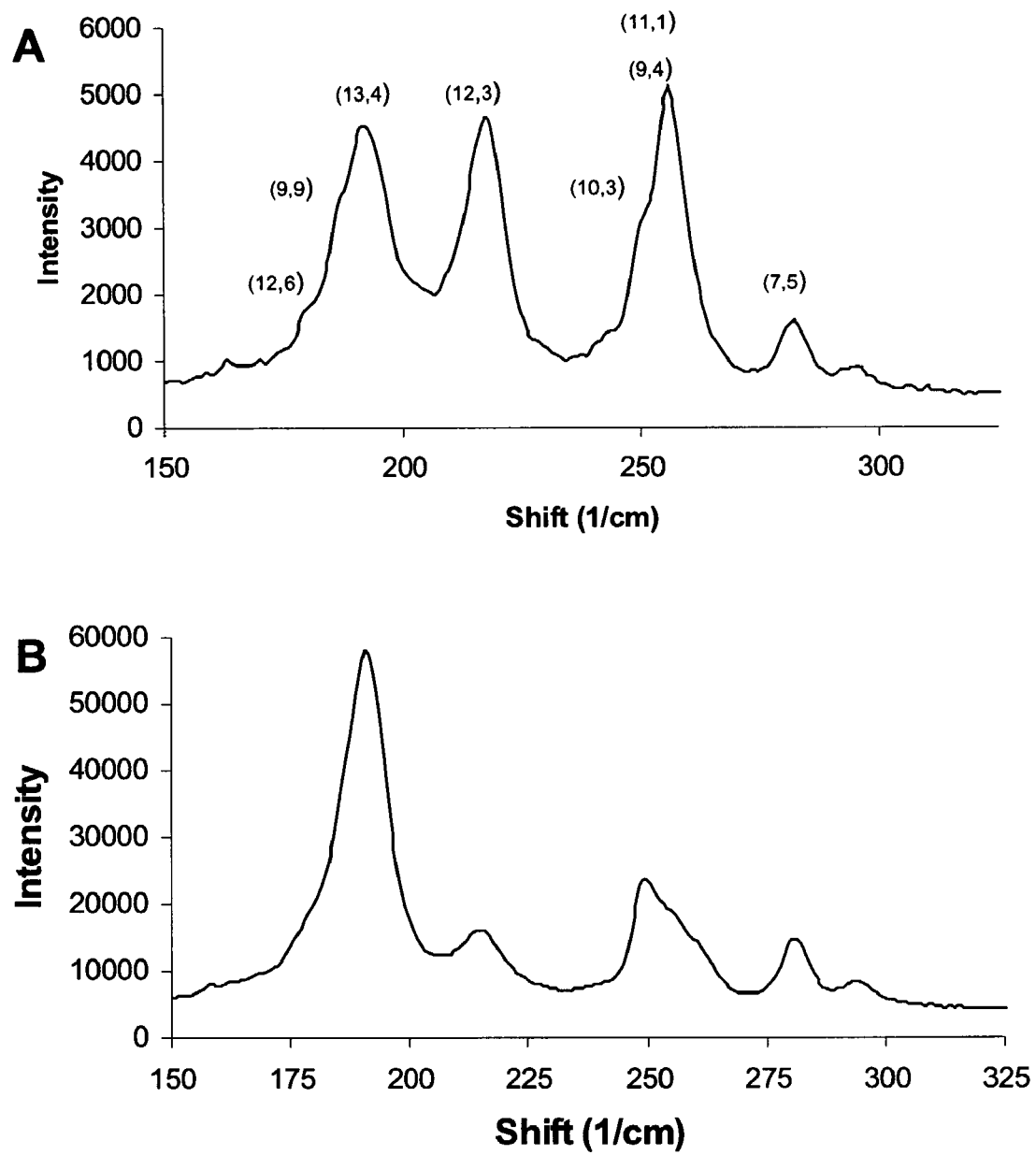
FIGS. 3A and 3B depict Raman spectra (633 nm excitation) of (A) a bulk nanotube sample, and (B) a nanotube sample enriched in metallic CNTs by methods of the present invention, wherein (n,m) assignments have been inserted, and wherein the He—Ne laser (633 nm) probes both the metallic (including semi-metallic) and semiconducting CNTs.

In some embodiments of the present invention, raw (as-produced, unpurified) CNTs are dispersed as individuals in a surfactant-water mixture according to a published procedure (see O'Connell et al., *Science,* 2002, 297, 593). Once the dispersion is obtained, the material is either selectively functionalized (see Strano et al., *Science,* 2003, 301, 1519) or heavily functionalized (see Dyke et al., *Nano Letters,* 2003, 3, 1215) with diazonium salts. Referring to FIG. 1, the selective functionalization is used to place polar or nonpolar groups on a particular type (or types) of nanotube. Once the nanotubes are selectively functionalized with an appropriate functional group, the sample is then reacted the rest of the way with the opposite functional group (i.e., if polar groups are used for the selective work, then nonpolar groups are used to react the sample to its greatest extent). After completion of the reaction, the sample is isolated and cleaned. For bulk separation, the purified nanotube sample is then dispersed in a minimum (e.g., 0.5 mg of nanotubes in 10 mL of solvent) of o-dichlorobenzene (ODCB, a nonpolar solvent). Flash chromatography is then performed with silica gel as the stationary phase and ODCB as the mobile phase. After the nonpolar portion of the nanotube elutes from the column, the column is then washed with N,N-dimethylformamide (DMF, a polar solvent) to elute the polar component. This constitutes separation of the bulk nanotube sample into two portions, polar and nonpolar components. When this separation is performed on a sample that has nonpolar groups attached to the semi-metallic type nanotubes or a heavily functionalized sample, the nonpolar component is greatly enriched in semi-metallic CNTs. This therefore constitutes a bulk separation of nanotubes by type. FIG. 2 constitutes a typical synthesis to produce a polar and nonpolar component where the metallic CNTs are also polar and the semiconductors are nonpolar. FIGS. 3A and 3B show the Raman analysis of a sample enriched in metallic CNTs employing the bulk separation (FIG. 3B) in comparison to an as-prepared sample (FIG. 3A). See Examples (vide infra) and Dyke et al., *J. Am. Chem. Soc.*, 2005, 127, 4497 for a more detailed discussion of the Raman analyses described herein and the caveats thereof.

In some embodiments, the CNTs are dispersed in a superacid media, such as oleum, instead of being dispersed as surfactants. See Hudson et al., *J. Am. Chem. Soc.* 2004, 126, 11158. While suspended in such media, the CNTs are then differentially-functionalized via diazonium chemistry (or other chemistry) as described above.

In some embodiments, the CNTs are dispersed in ionic liquids. Processing in such liquids may have environmental (i.e., "green chemistry") benefits.

In some embodiments, bis-diazonium species (e.g., $N_2$—$C_6H_4$—$CH_2$—$C_6H_4$—$N_2$) are used to selectively react with the metallic and semi-metallic CNTs to form crosslinked agglomerations of metallic and semi-metallic CNTs. These can then be separated from the semiconducting CNTs on the basis of their being less soluble/suspendable in the solvent. Additionally or alternatively, some type of filtration (e.g., a filtration bed) can be used to separate the crosslinked metallic/semi-metallic CNTs from the semiconducting CNTs.

By selectively affecting the chemical properties of the metallic/semi-metallic and the semiconducting CNTs, other methods of separation could be employed to carry out such separation, particularly on a bulk scale, and should be viewed as falling within the scope of the present invention. Such separation methods include, but are not limited to, crystallization, precipitation, extraction, and combinations thereof.

The following Examples are included to demonstrate particular embodiments of the present invention. It should be appreciated by those of skill in the art that the methods disclosed in the examples that follow merely represent exemplary embodiments of the present invention. However, those of skill in the art should, in light of the present disclosure, appreciate that many changes can be made in the specific embodiments described and still obtain a like or similar result without departing from the spirit and scope of the present invention.

In Examples 1-9 which follow, a separation of SWNTs by type is conducted by changing the chemical properties of the metallic SWNTs in relation to the semiconductor SWNTs and then performing filtration through silica gel. Referring to Methods I and II in FIGS. 4 (Scheme 1) and 5 (Scheme 2), respectively. The nonpolar component from Separation Methods I and II is enriched in the metallic nanotubes. Separation Method I is deemed operationally simpler and complementary to Separation Method II for certain tube type segregations, especially when probed with Raman spectroscopy at 780 nm. The functionalized metallics (SWNTs) can be rationalized as being less polar than the functionalized semiconductors (SWNTs) in Separation Method II because the semiconductors had hydroxylated addends. However, one can only speculate that the segregation mode between metallics and semiconductors in Separation Method I, wherein the 4-tert-butylphenyl addend was the only functionality used, is likely due to some metallic SWNTs being more heavily functionalized than the semiconductors in Separation Method I, therefore making them less polar and more prone to migration on silica gel. Use of less disperse SWNT starting materials or use of high-performance liquid chromatography (HPLC) on silica gel, would likely afford greater separation efficacies on the functionalized SWNTs. The pore size of the silica gel is 150 Å, thus the pore size is likely too small for significant size-exclusion-based length discrimination of these rigid structures. A careful comparison was made between the Raman spectra of the silica gel filtration-enriched samples and those of SWNTs of varying morphologies prepared from flocculation or thermal regeneration (Heller et al., *J. Phys. Chem. B*. 2004, 108, 6905). If comparison had been made from only the flocculated material derived from the SWNT/SDS material, a false impression for enrichment efficacy would result. The analyses, therefore, underscore the need to compare similar deposition methods and multiple excitation wavelength Raman analyses.

Example 1

This example serves to illustrate a general methodology by which SWNTs can be separated by bandgap in bulk quantities, in accordance with some embodiments of the present invention.

Generally, a method to maintain the SWNTs in unroped form for separations must be utilized. SWNTs have a cohesive inter-tube attraction of 0.5 eV per nm of tube length and this must be overcome prior to their separation. Applicants have previously shown that aryldiazonium salts can react with sodium dodecylsulfate (SDS)-wrapped SWNTs (SWNT/SDS) in aqueous solutions to afford SWNT sidewall aryl addends with up to ca. 1 in 10 SWNT carbons being aryl-functionalized (Strano et al., *Science* 2003, 301, 1519). In the starting surfactant-wrapped form, the SWNTs remain dispersed as individuals rather than existing as bundled or roped structures (in this context, bundles are defined as ca. 2-5 SWNTs adhering to each other, and ropes as >5 SWNTs adhering via their sidewalls). By slowly adding the aryldiazonium salts, the metallic SWNT sidewalls are preferentially functionalized, to the exclusion of the semiconductors' sidewalls (Strano et al., *Science* 2003, 301, 1519).

Disclosed here are two different methods for the reaction/filtration/regeneration of enriched SWNT fractions: Separation Method I (FIG. 4, Scheme 1) and Separation Method II (FIG. 5, Scheme 2). In Separation Method I, the mixture of SWNTs was heavily functionalized with 4-tert-butylphenyl addends to afford solubility to the entire mixture of SWNT types. Two major polarity fractions were separated by filtration through silica gel, and then thermalized to remove the addends, followed by Raman analysis to discern enrichment of the SWNT types.

Figure 4:
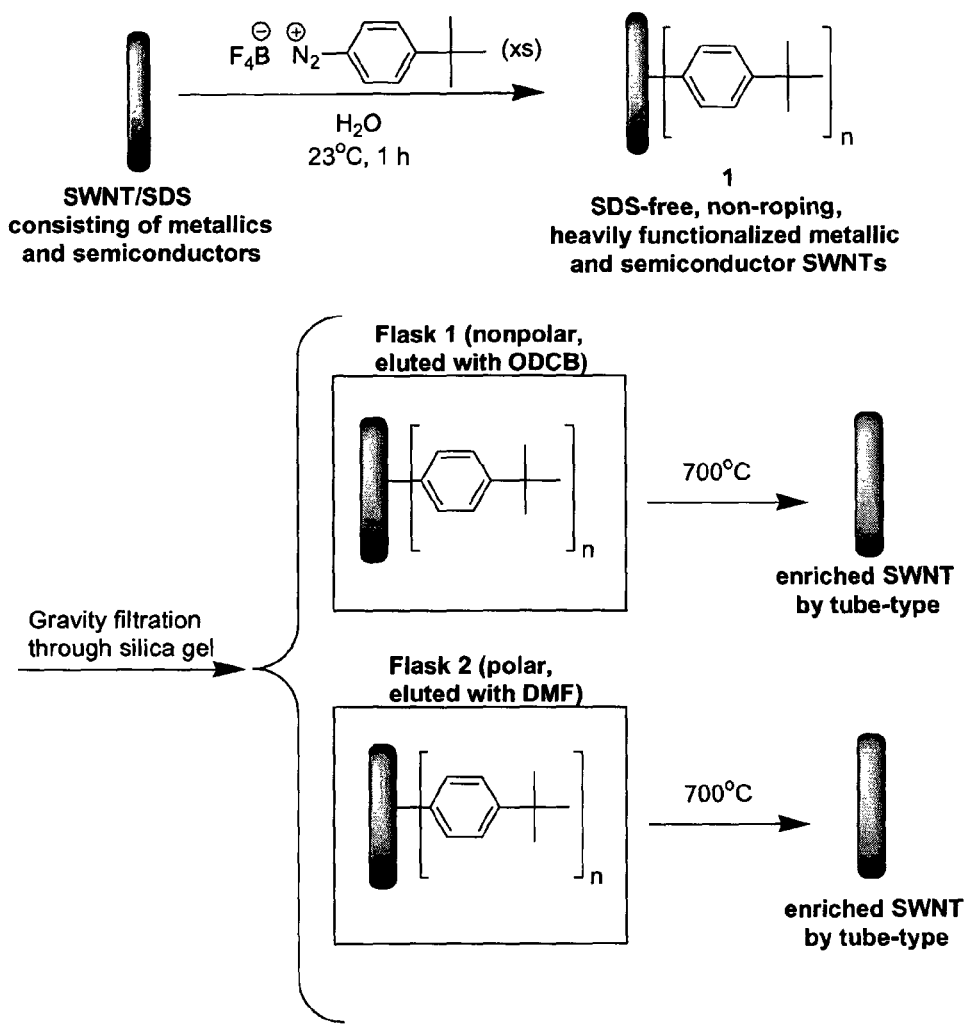
FIG. 4 (Scheme 1) illustrates Separation Method I, where heavily functionalized SWNTs are generated from SDS-SWNTs, and the mixture of the functionalized metallic and semiconducting SWNTs is subject to filtration through silica gel, to generate a nonpolar band (eluted with o-dichlorobenzene) and a polar band (eluted with DMF), and where thermolysis results in addend cleavage to generate enriched SWNT fractions by bandgap.
Figure 5:
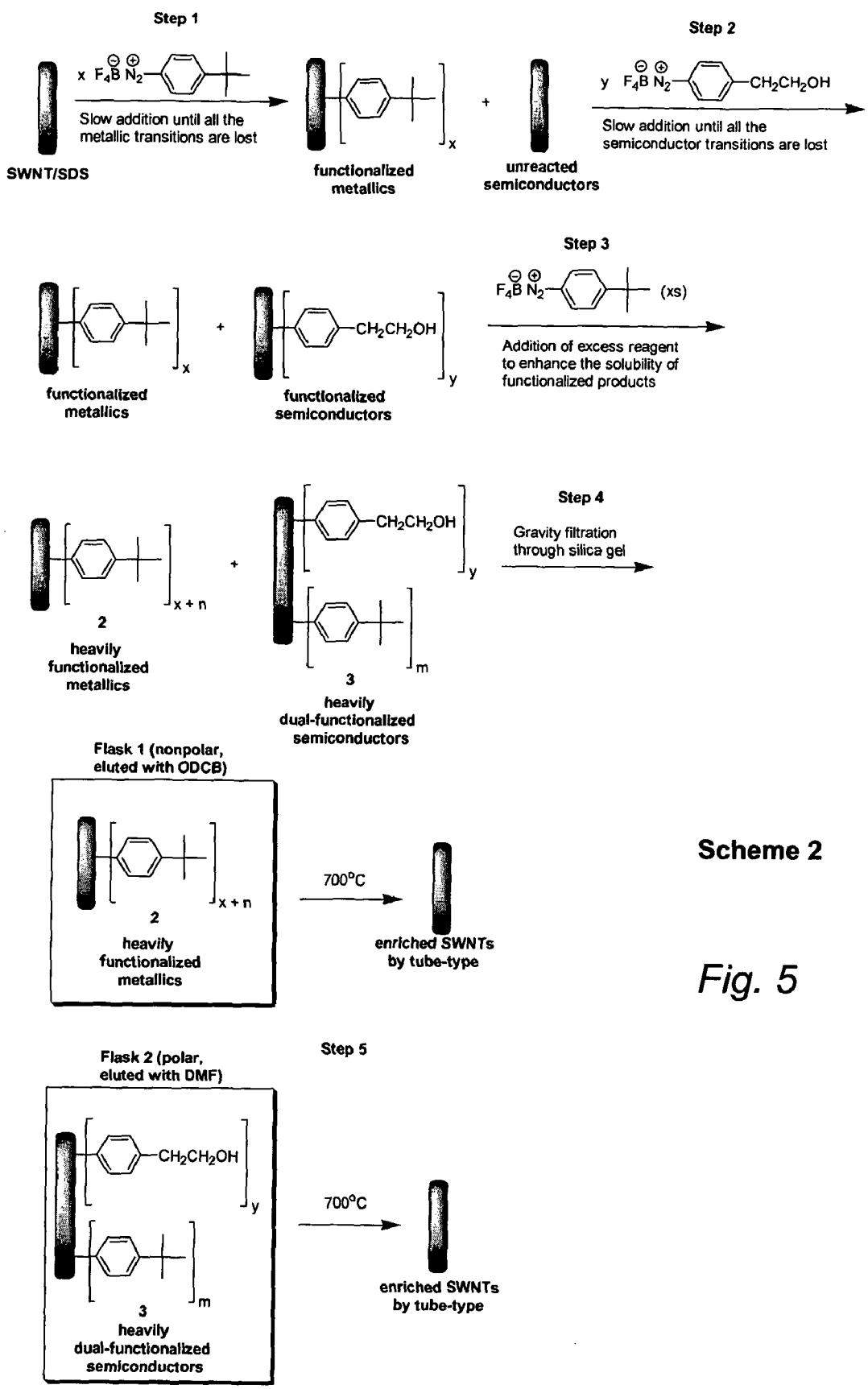
FIG. 5 (Scheme 2) illustrates Separation Method II, where selective functionalization is followed by completely functionalizing the SWNTs using two different polarity addends, and the mixture of the functionalized metallic and semiconducting SWNTs is subject to filtration through silica gel, to generate a nonpolar band (eluted with o-dichlorobenzene) and a polar band (eluted with DMF), and where thermolysis results in addend cleavage to generate enriched SWNT fractions by bandgap.

Referring to FIG. 4, Scheme 1 (Separation Method I), heavily functionalized SWNTs are generated from SDS-SWNTs. The mixture of the functionalized metallic and semi-conducting SWNTs is subject to filtration through silica gel generating a nonpolar band (eluted with odichlorobenzene) and a polar band (eluted with DMF). Thermolysis results in addend cleavage to generate enriched SWNT fractions by bandgap. Referring to FIG. 5, Scheme 2 (Separation Method II), selective functionalization is followed by completely functionalizing the SWNTs using two different polarity addends. The mixture of the functionalized metallic and semiconducting SWNTs is subject to filtration through silica gel generating a nonpolar band (eluted with o-dichlorobenzene) and a polar band (eluted with DMF). Thermolysis results in addend cleavage to generate enriched SWNT fractions by bandgap.

While Separation Method II is more complex, it affords a complementary degree of purity for the metallic products. Once the metallic SWNTs had been preferentially reacted via titration with 4-tert-butylbenzenediazonium tetrafluoroborate (affording addend type-A, a nonpolar moiety) (Scheme 2, Step 1), the semiconducting SWNTs were then titrated with a complementary aryidiazonium salt, 4-(2'-hydroxyethyl)benzenediazonium tetrafluoroborate (affording addend type-B, a polar moiety) (Scheme 2, Step 2), to serve as a different polarity-based SWNT sidewall addend. Both lightly-functionalized SWNT types were then further functionalized with addend type-A (Scheme 2, Step 3) to confer them with increased solubility and to prevent their re-bundling or re-roping upon removal of the SDS. This mixture was then subjected to a separation protocol using filtration through silica gel to generate enriched functionalized metallic SWNTs (Scheme 2, Step 4). Thermal treatment of the separated functionalized SWNTs removes the addends and regenerates two distinct fractions of the unfunctionalized SWNTs (Scheme 2, Step 5), the first being enriched in metallic types.

When viewed in total, the separations methods described here afford some modest level of enrichment; however, less encouraging enrichment levels than would have been gleaned from comparative analyses based upon differing morphologies and singular Raman excitation wavelength studies. Therefore, the enrichment protocol here underscores the care needed in spectroscopically assessing SWNT purities.

Example 2

This example serves to illustrate methods of nanotube synthesis and the preparation of individualized SWNTs, in accordance with some embodiments of the present invention.

Figure 6:
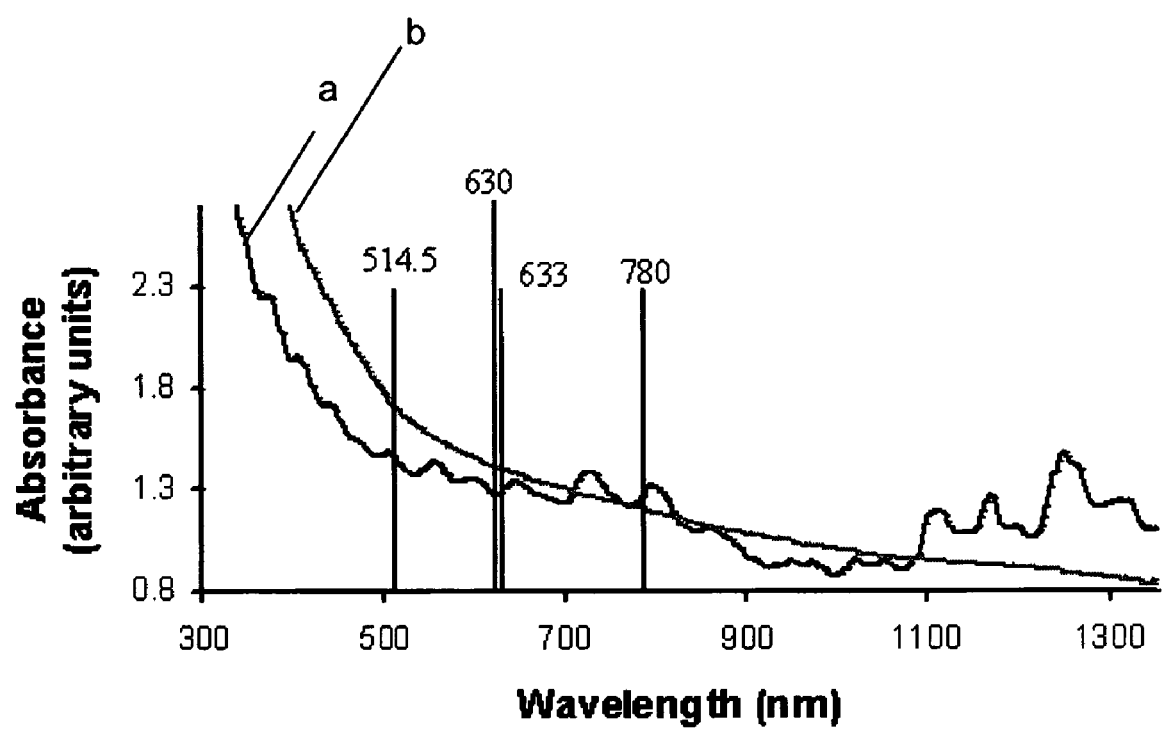
FIG. 6 depicts absorption spectra of (a) SDS-coated SWNTs in water and (b) SDS-coated SWNTs in water that have been heavily functionalized with 4-tert-butylbenzenediazonium tetrafluoroborate, as described in Separation Method I (Scheme 1)

Raw, bulk nanotubes were prepared by the HiPco process (Nikolaev et al., *Chem. Phys. Lett.* 1999, 313, 91) and obtained from the Carbon Nanotechnologies Laboratory, HiPco Center, at Rice University. This material, in general, has a diameter range from 0.6 nm to 1.3 nm with approximately 50 different SWNT types defined by n and m, containing metallics and semiconductors (Bachilo et al., *Science* 2002, 298, 2361; Strano et al., *Nano Lett.* 2003, 3, 1091). The iron catalyst used in the HiPco process gives an iron content of ca. 25 wt % with a small amount of amorphous carbon also present. The raw material was subjected to the published procedure (O'Connell et al., *Science* 2002, 297, 593; Strano et al., *J. Nanosci. Nanotech.* 2003, 3, 81; Moore et al., *Nano Lett.* 2003, 3, 1379) of surfactant wrapping to afford predominately individual SWNT/SDS in water with <2 wt % iron content. Specifically, the following protocol was used. The raw material (80 mg) is added to a flask loaded with SDS (2.0 g, 1 wt %). Ultrapure $H_2O$ (200 mL) is then added to the vessel and the aqueous solution is homogenized (Polyscience X-520, 750-Watt ultrasonic homogenizer) for 1 h. The freshly homogenized solution is sonicated in a cup-horn sonicator (Cole-Palmer CPX-600) for 10 min at 540 W. The sonicated mixture is centrifuged (Sorvall 100S Discovery Ultracentrifuge) at 30,000 rpm for 4 h. Centrifugation causes the more dense bundles and iron particles to sediment, and the upper 80 vol % portion is decanted to give predominately individuals (non-bundled and non-roped) SWNT/SDS while the lower 20 vol % contains SWNT ropes, SWNT bundles and residual iron catalyst. Referring to FIG. 6, absorption spectra of (a) SDS-coated SWNTs in water and (b) SDS-coated SWNTs in water that have been heavily functionalized with 4-tert-butylbenzenediazonium tetrafluoroborate as described in Separation Method I (FIG. 4, Scheme 1). Since the SWNTs now exist as SDS-wrapped individuals, the UV/Vis/NIR spectra (FIG. 6, Trace a) is not convoluted from bundling and clearly shows transitions from both metallics (below 630 nm) and semiconductors (above 633 nm) (Strano et al., *Science* 2003, 301, 1519). The concentration of the SWNTs varies from 20 to 25 mg/L of SDS-coated SWNTs with greatly reduced iron content (O'Connell et al., *Science* 2002, 297, 593; Strano et al., *J. Nanosci. Nanotech.* 2003, 3, 81; Moore et al., *Nano Lett.* 2003, 3, 1379). This material can be either heavily or selectively functionalized with diazonium salts depending on the procedure used, as discussed below (Strano et al., *Science* 2003, 301, 1519; Dyke et al., *Nano Lett.* 2003, 3, 1215).

Example 3

This example serves to illustrate, in greater detail, Separation Method I, said method involving direct heavily functionalized SWNTs, in accordance with some embodiments of the present invention.

Heavily functionalized material (FIG. 4, Scheme 1) is obtained according to the published procedure (Dyke et al., *Nano Lett.* 2003, 3, 1215) from the SWNT/SDS. The pH of the aqueous nanotube solution (100.0 mL, 0.002 mM, 0.20 meq of carbon) is adjusted to pH 10 with 1.0 M NaOH (Dyke et al., *Synlett* 2004, 155). An excess of 4-tert-butylbenzenediazonium tetrafluoroborate (0.120 g, 0.48 mmol) is added as a solid to the SWNT/SDS solution. The reaction mixture is allowed to stir at RT for 1 h. The reaction is monitored by UV/Vis/NIR to confirm loss of van Hove singularities (FIG. 6, *b*); complete loss of singularities is indicative of chemically functionalized sidewalls (Bahr et al., *J. Am. Chem. Soc.* 2001, 123, 6536; Dyke et al., *Chem.-Eur. J.* 2004, 10, 813). After this point, the solution is diluted with acetone which dissolves excess salt and causes the SDS to become dissociated from the SWNTs which immediately flocculate. The flocculated functionalized SWNTs are filtered over a PTFE-membrane (Sartorius, 0.45 µm pore size) and the solid functionalized nanotubes are collected and re-dispersed in DMF (10 mL) using a bath sonicator (Cole-Parmer Ultrasonic Cleaner 08849-00) for 1 min. The solution is filtered a second time through a PTFE-membrane, washed with acetone and the collected solid is then manipulated as needed (vide infra). The second filtration is performed to remove SDS and diazonium salt trapped during flocculation.

The flocculated functionalized SWNTs are dispersed in o-dichlorobenzene (ODCB) (20 mL, 1 mL per 0.2 mg of functionalized SWNTs) by sonicating in a bath sonicator for 1 min. The solution was then introduced to a glass ODCB slurry-packed silica gel (silica gel, Davisil, grade 646, 35-60 mesh, Sigma-Aldrich) column. The column diameter was 2 inch with a 10-inch length of silica gel packing; this column loading required ca. 60 g of silica gel and 300 mL of ODCB to make the slurry. Use of finer grades of silica gel inhibits the functionalized SWNT elution. The chromatographic separation ensued by gravity using ODCB as the mobile (nonpolar) phase solvent. By simply visually monitoring the black-band progression, a faster moving band was noted and a second immobile band remained at the top of the column. Once the mobile band had fully eluted (ca. 50 mL of ODCB was used; 1 min from introduction of the functionalized nanotube solution), the solvent was changed to DMF and the slower moving band (polar) eluted (ca. 250 mL of DMF was used) over a period of 15 min. This protocol separated the nanotubes into a nonpolar (faster-moving band) and a polar (slower-moving band) component. The two components were collected by filtering again through a PTFE membrane and evaporating to dryness by rotary evaporation then in vacuo (0.2 mm Hg). Of the 4.0 mg of functionalized material placed on the column, 3.2 mg was collected after gravity separation. The faster-moving component (nonpolar, Flask 1 in Scheme 1) consisted of 1.3 mg of material and the slower-moving (polar, Flask 2 in Scheme 1) fraction had a weight of 1.9 mg. The functionalized material can be heated in an inert atmosphere (argon) and the addends evolve from the sidewalls of the SWNTs thereby regenerating the pristine, near-defect-free compounds in most cases; this was accomplished in a thermo-gravimetric analysis (TGA) apparatus. The loss of the addends begins at ca. 250° C. and they are completely removed by 700° C. (Dyke et al., *Synlett* 2004, 155; Dyke et al., *Chem.-Eur. J.* 2004, 10, 813). The regenerated, pristine nanotubes were analyzed by Raman spectroscopy to determine the content of nanotube types and atomic force microscopy (AFM) was used to determine length (vide infra).

Note that in addition to the silica gel described above, other stationary phases have been investigated. A large amount of the functionalized SWNTs was retained on the columns with stationary mesh sizes of 100 and above (the particles are 180 µm in diameter and smaller); however, silica gel (Sigma-Aldrich), polypyridine, or Dowex ion exchange resins, 35-60 mesh, all allowed a substantial amount of the functionalized SWNTs to elute with little material trapped on the head of the column. Of the three stationary phases investigated, silica gel afforded the best enrichment by nanotube type.

Example 4

This example serves to illustrate, in greater detail, Separation Method II, said method involving selectively functionalized SWNTs, in accordance with some embodiments of the present invention.

Figure 7:
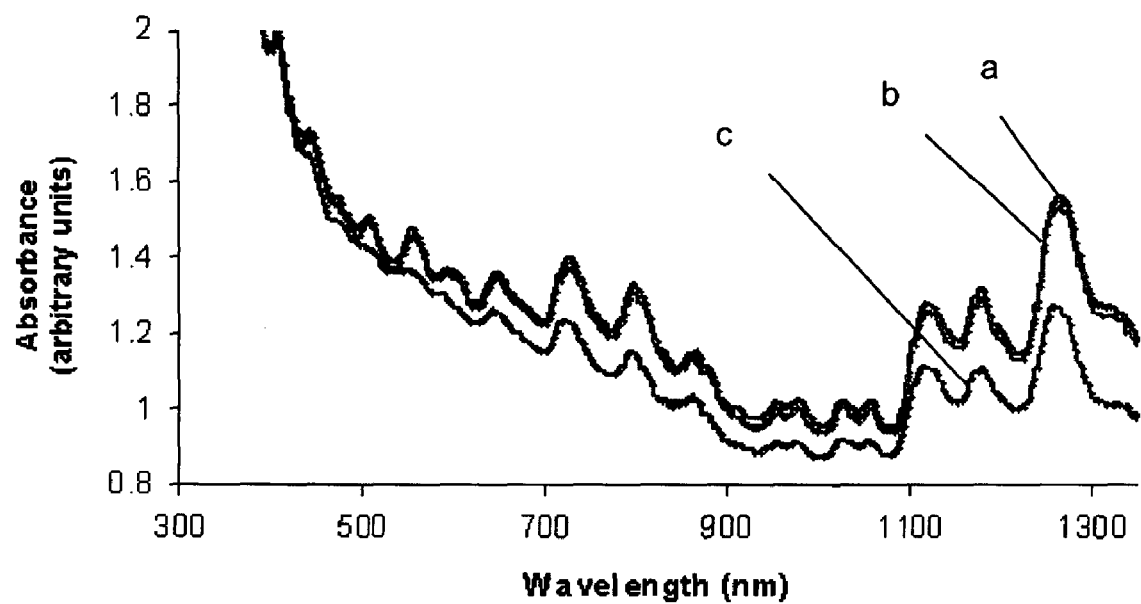
FIG. 7 depicts absorption spectra of (A) starting SDS-coated SWNTs in water, (B) the same SDS-coated SWNTs after 15 additions of 4-tert-butylbenzenediazonium tetrafluoroborate, and (C) the same SDS-coated SWNTs after 24 additions of 4-tert-butylbenzenediazonium tetrafluoroborate, as described in Separation Method II (Scheme 2)

SDS-coated SWNTs are selectively functionalized according to a published procedure (Strano et al., *Science* 2003, 301, 1519). FIG. 7 depicts absorption spectra of (a) starting SDS-coated SWNTs in water, (b) the same SDS-coated SWNTs after 15 additions of 4-tert-butylbenzenediazonium tetrafluoroborate, and (c) the same SDS-coated SWNTs after 24 additions of 4-tert-butylbenzenediazonium tetrafluoroborate as described in Separation Method II (Scheme 2). The aqueous SDS-coated SWNTs solution (150.0 mL, 0.002 mM, 0.31 meq of carbon) was divided into three portions each containing (50 mL, 0.002 mM, 0.10 meq of carbon) so as to make the operation more manageable. To each of the three flasks, 4-tert-butylbenzenediazonium tetrafluoroborate (0.002 mM) is added in 10 µL portions to the starting SDS/SWNT solution every 30 min until the UV/Vis transitions corresponding to the metallics (FIG. 7, *a*) are no longer present. After 24 additions to each flask, the selective functionalization is complete (FIG. 7, *c*), and the absorption spectrum is monitored throughout the addition process (Scheme 2, Step 1). A second solution, 4-(2-hydroxyethyl)benzenediazonium tetrafluoroborate (0.012 g, 0.05 mmol) in ultrapure $H_2O$ (20 mL), is prepared. The 4-(2-hydroxyethyl)benzenediazonium tetrafluoroborate solution (0.003 mM) is added in 10 µL portions to each of the three SWNT/SDS solutions every 30 min (ca. 35 additions) until the UV/Vis/NIR transitions corresponding to the semiconductors are no longer present (Scheme 2, Step 2). An excess of the 4-tert-butylbenzenediazonium tetrafluoroborate (0.060 g, 0.40 mmol) is then added as a solid to each of the three SDS/SWNT solutions (Scheme 2, Step 3). This excess appendage of 4-tert-butylphenyl moieties to all of the SWNTs prevents subsequent bundling and increases the solubility of the functionalized SWNTs in organic solvent (Dyke et al., *Nano Lett.* 2003, 3, 1215; Dyke et al., *Chem.-Eur. J.* 2004, 10, 813; Dyke et al., *J. Am. Chem. Soc.* 2003, 125, 1156) (ca. 0.7 to 0.5 mg/mL solubility in DMF and ODCB, respectively). The three solution flasks were combined into one and further worked up, filtered and washed as described above.

The flocculated material from the selective functionalization reaction was dispersed in ODCB (20 mL total, 1 mL per 0.2 mg of functionalized SWNTs) by sonicating in a bath sonicator for 1 min. The functionalized SWNT mixture (4.0 mg) (2+3) was introduced onto an ODCB slurry-packed silica gel (silica gel, Davisil, grade 646, 35-60 mesh, Sigma-Aldrich) column packed as described above. Phases were separated by gravity first using ODCB as the mobile phase. Once the nonpolar component was collected in Flask 1 (Scheme 2) which required ca. 50 mL of ODCB for the 1-min elution, the mobile phase was changed to DMF and the polar component fully eluted into Flask 2 (Scheme 2) after using ca. 350 mL of DMF for 20 min. The materials in the separate flasks were filtered through a PTFE membrane. A total of 1.0 mg was lost on the head of the column, and of the remaining 3.0 mg of material collected, the faster-eluting band (nonpolar band) weighed 0.6 mg and the remainder of the weight (2.4 mg) corresponded to the slower-eluting band (polar component). Thermal treatment (Scheme 2, Step 5), as described above, afforded the enriched SWNT samples.

Example 5

This example serves to illustrate determination of the degree of functional group coverage by correlating UV-Vis transitions to XPS, in accordance with some embodiments of the present invention.

XPS data were acquired on a Physical Electronics (PHI 5700) XPS/ESCA system with typical base pressure of $5 \times 10^{-9}$ torr. A monochromatic Al X-ray source at 350 W was used with an analytical spot size of 1.2 mm and 750 takeoff angle. Atomic concentration values were calculated with PHI Multipak software using factory calibrated values for the sensitivity factors of the respective elements (C 1s, O 1s, F 1s, I 3d). Binding energy values were referenced externally to an Au 4*f* peak at 84.00 eV, and internally to a C 1s binding energy of 284.50 eV (NIST XPS database). Samples of functionalized SWNTs were flocculated from solution using acetone and filtered onto aluminum oxide membranes with 100 nm average pore size (Whatman Anodisc). The supported SWNT mat sample was then dried in vacuo overnight and removed from the membrane as a thin, freestanding nanotube film. The films were mounted on grounded sample holders with tungsten cover shields and loaded into the ultra-high vacuum (UHV) chamber of the instrument.

Figure 8:
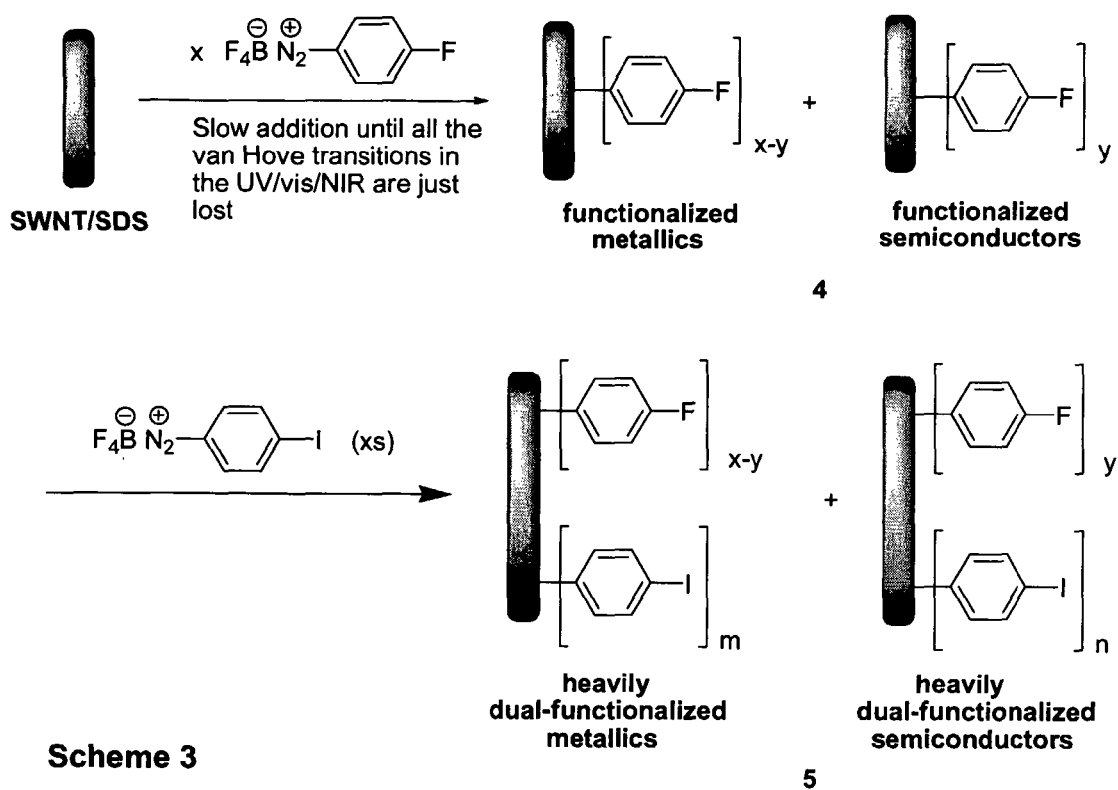
FIG. 8 (Scheme 3) depicts iterative functionalization to determine coverage by TGA and XPS analysis, in accordance with EXAMPLE 5.
Figure 9:
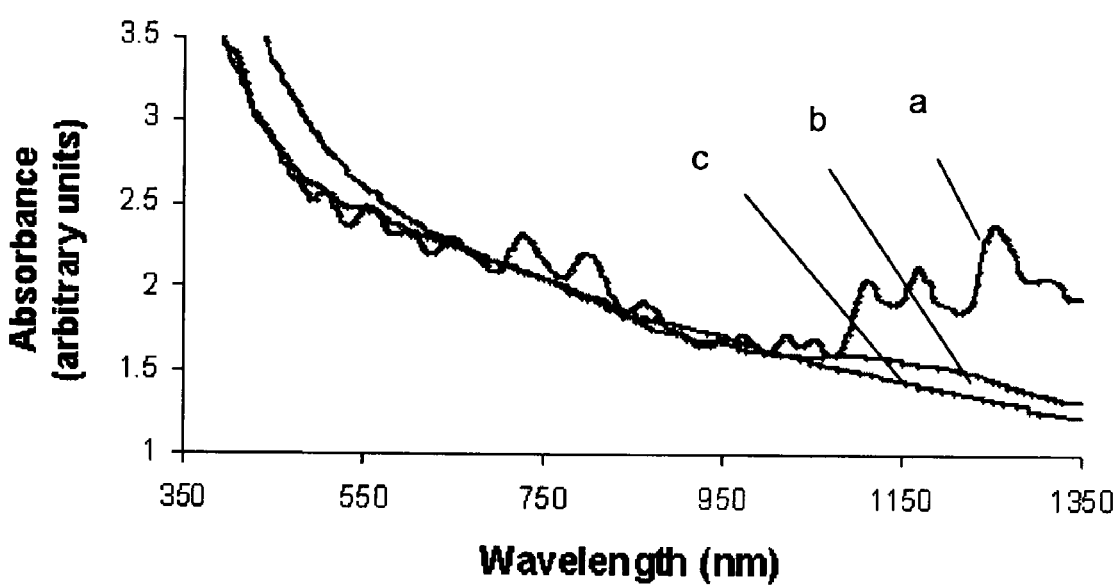
FIG. 9 depicts absorption spectra of (a) starting material SDS/SWNTs, (b) after slow addition of the 4-fluorobenzenediazonium tetrafluoroborate until the transitions are lost, and (c) after addition of an excess of the 4-iodobenzenediazonium tetrafluoroborate, as described in Scheme 3.
Figure 10A:
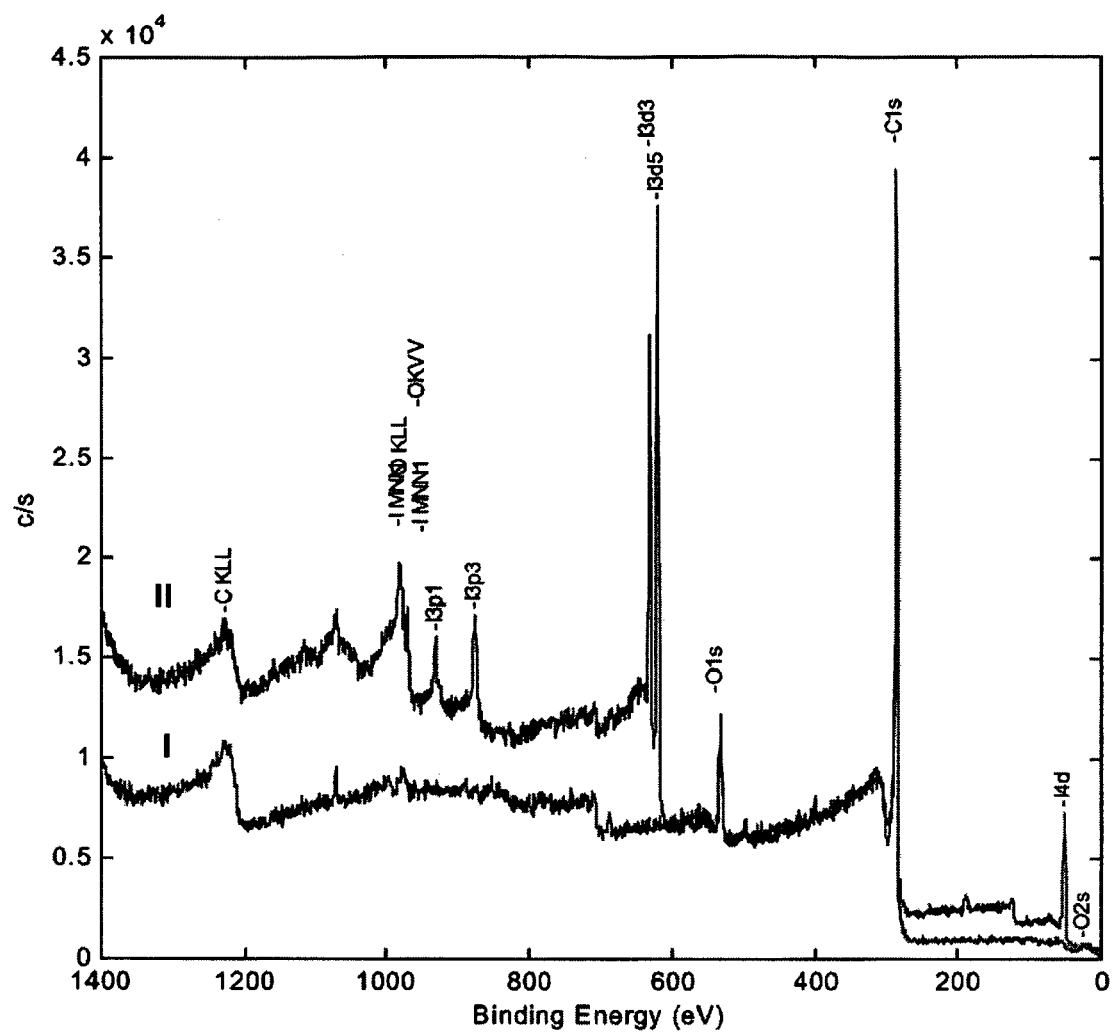

A question that had to be answered was: How many functional groups are appended to the SWNTs after all the van Hove singularities are lost in the absorption spectra? Heavily functionalized material generally has an aryl moiety covalently attached to ca. 1 in 10 SWNT carbons on the nanotube, (Dyke et al., *Nano Lett.* 2003, 3, 1215) but selectively functionalized material does not have as high a degree of coverage. An estimate of the degree of coverage for selectively functionalized material was determined by functionalizing the SWNTs until all of the van Hove singularities were just lost. This was conducted by reacting the SWNT/SDS solution (100 mL, 0.002 mM, 0.2 meq of carbon) with an aqueous solution of 4-fluorobenzenediazonium tetrafluoroborate (3.5 mM) by adding 50 µL every 30 min. The portions were added, and the UV/Vis/NIR spectra were monitored after each addition, until all the van Hove singularities (metallics and semiconductors) in the entire spectrum were lost. See FIG. 8, Scheme 3 depicting iterative functionalization to determine coverage by TGA and XPS analysis; and FIG. 9, depicting absorption spectra of (a) starting material SDS/SWNTs, (b) after slow addition of the 4-fluorobenzenediazonium tetrafluoroborate until the transitions are lost, and (c) after addition of an excess of the 4-iodobenzenediazonium tetrafluoroborate as described in FIG. 8, Scheme 3. After this, an excess of 4-iodobenzenediazonium tetrafluoroborate (0.254 g, 0.8 mmol) was added (FIG. 8, Scheme 3; and FIG. 9). The addition of this latter aryl iodide did not affect the UV/Vis/NIR spectra since all the transitions were already lost after addition of the aryl fluoride. The material was treated as described above; it was not filtered through silica gel. After purification of the material by dispersing in DMF with mild sonication, filtering through PTFE and washing with acetone, it was dried in a vacuum oven at 70° C. overnight. The dried, functionalized SWNT was analyzed by XPS to determine the degree of coverage required to lose the optical properties of the nanotube sample.

FIGS. 10A-10E depict XPS analysis of the iterative functionalization products (aryl fluoride then aryl iodide as shown in Scheme 3), showing both the fluorinated material (trace I), and the fluoroaromatic-grafted material that was treated with 4-iodobenzenediazonium tetrafluoroborate (trace II) after the van Hove transitions were lost in the UV/Vis/NIR spectrum. XPS spectra were obtained at a 750 takeoff angle and 23.5 eV pass energy. The XPS analysis consisted of A) survey of the spectral region from 0 to 1400 eV, B) the carbon 1 s region, C) the iodine 3d5 region showing a strong presence of iodophenyl groups in the sample treated with 4-iodobenzenediazonium tetrafluoroborate, D) the fluorine 1 s region showing a slight decrease in the concentration and chemical state of the grafted fluorophenyl groups, and E) the valence region showing a signal for iodine 5p at 3.5 eV only in the iodophenyl-grafted sample. It is apparent from XPS (FIGS. 10A-10E) that the SWNTs react even after the optical properties are lost. The first sample analyzed was mixture 4, which was reacted until the van Hove singularities were just lost, and the C to F ratio was 99:1. The second sample analyzed was mixture 5, which had a C to F to I ratio of 93:1:7, therefore, for every 1 fluoride atom on the nanotube there are ca. 7 iodide atoms. TGA of this same material gave 7.5% wt loss for mixture 4 which corresponds to 1 in 100 carbons on the nanotube with an aryl fluoride moiety appended. TGA of the fully functionalized mixture 5 had a 50% wt loss which corresponds to ca. 1 in 14 carbons on the nanotube bearing an aryl iodide or aryl fluoride moiety. This suggests that approximately only 1 in 100 carbons on the SWNTs are required to react to lose the optical properties.

Figure 11:
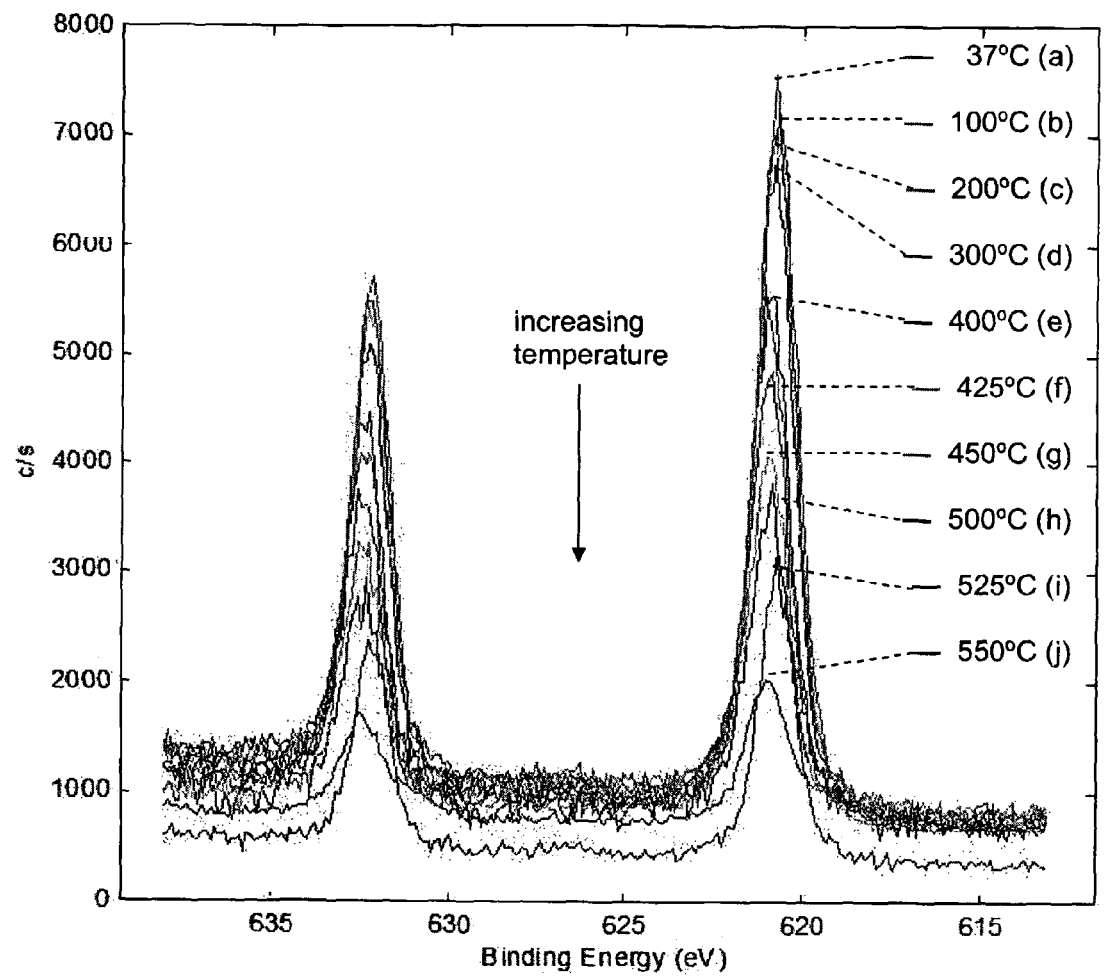
FIG. 11 depicts the iodine 3d region XPS of iodophenyl-functionalized SWNT material at 75° takeoff angle, undergoing heating from 37° C. to 550° C. (Traces a-j) at approximately 5° C. min$^{-1}$ in UHV (5×10$^{-9}$ torr), where at room temperature the I 3 d$^{5/2}$ binding energy of 620.9 eV is consistent with an aryl iodide, and where at 550° C. the same signal broadens and shifts to lower binding energy (ca. 620.0 eV), indicating that the remaining iodine may exist as an inorganic salt.

The appended aryl moieties can be considered defect sites since at the reactive site on the nanotube sidewall, an $sp^2$-C is converted into an $sp^3$-C. This causes the nanotube to lose resonance at that excitation energy. Therefore, this study also serves as a predictor for the degree of defects on carbon nanotubes. In applications where the electronic or optical properties of SWNTs are required, clearly the fewer defects the better. At the same time, if the application causes defects, the efficiency will reduce considerably until the optical properties are lost. However, the sidewall chemisorption reaction is reversible upon heating, as seen in FIG. 11, which tracks the photoelectron intensity of iodine in a SWNT sample bearing 4-phenyl addends (FIG. 11 depicts the iodine 3d region XPS of iodophenyl-functionalized SWNT material at 750 takeoff angle, undergoing heating from 37° C. to 550° C. at approximately 5° C. min$^{-1}$ in UHV (5×10$^{-9}$ torr). At room temperature, the I 3d$^{5/2}$ binding energy of 620.9 eV is consistent with an aryl iodide. At 550° C., the same signal broadens and shifts to lower binding energy ca. 620.0 eV, indicating that the remaining iodine may exist as an inorganic salt).

Figure 12:
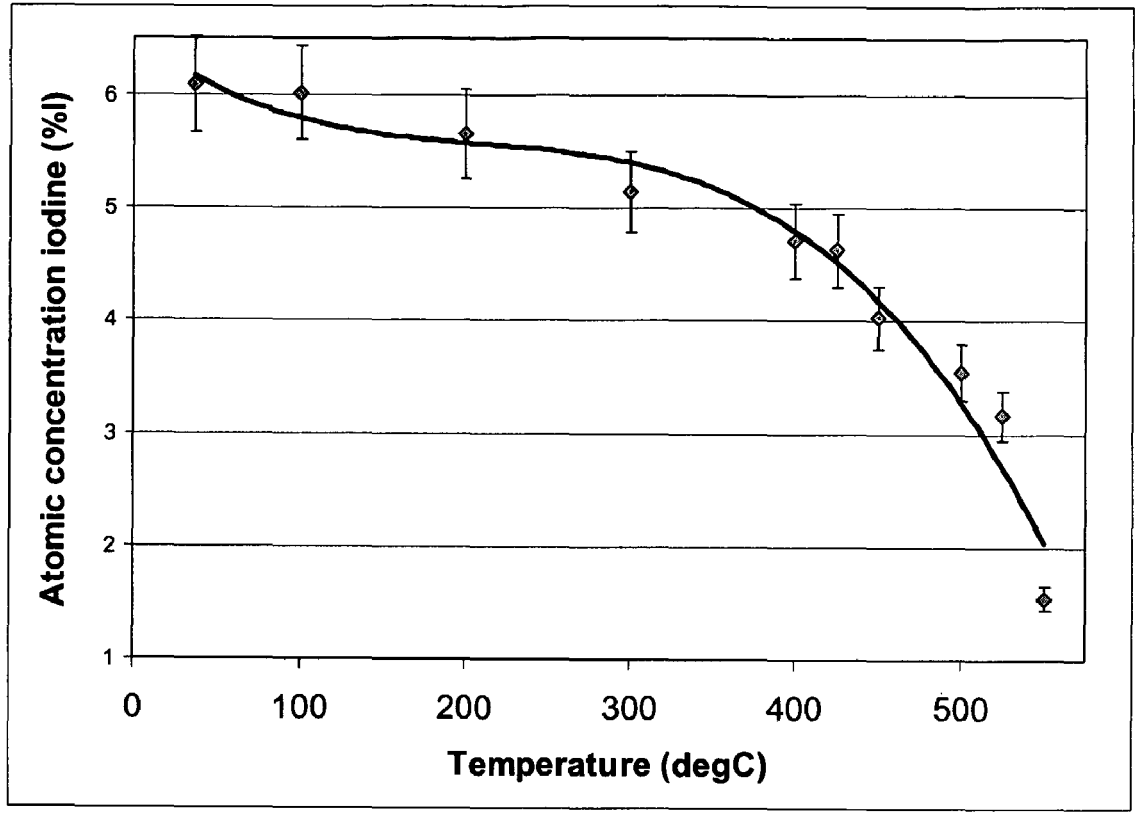
FIG. 12 depicts the atomic concentration of iodine as measured by XPS at a 75° takeoff angle of iodophenyl-functionalized SWNT material, where the thermal desorption of iodophenyl groups from carbon nanotube sidewalls shows a higher loss rate at temperatures above 425° C., which is consistent with TGA measurements of similar material under inert gas (nitrogen) flow.

Referring to FIG. 12, upon heating the iodophenyl-grafted nanotube sample above 400° C., the loss of iodine follows a similar profile as seen in earlier TGA analyses of sidewall reacted SWNT material using diazonium salts, (Dyke et al., *Nano Lett.* 2003, 3, 1215; Bahr et al., *J. Mater. Chem.* 2002, 12, 1952; Bahr et al., *J. Am. Chem. Soc.* 2001, 123, 6536), wherein FIG. 12 depicts the atomic concentration of iodine measured by XPS at 750 takeoff angle of iodophenyl-functionalized SWNT material. The thermal desorption of iodophenyl groups from carbon nanotube sidewalls shows a higher loss rate at temperatures above 425° C., which is consistent with TGA measurements of similar material under inert gas (nitrogen) flow (Bahr et al., *J. Mater. Chem.* 2002, 12, 1952; Bahr et al., *J. Am. Chem. Soc.* 2001, 123, 6536; Dyke et al., *Chem.-Eur. J.* 2004, 10, 813).

Example 6

This example serves to provide a background for the Raman spectroscopy described in subsequent examples.

The Raman spectra were obtained on a Renishaw Ramascope which was equipped with 514.5 nm, 633 nm, and 780 nm lasers. The spectra obtained with the 780 nm excitation were performed with a grating of 1200 l/mm, and the 514.5 and 633 nm employed an 1800 l/mm grating. All of the nanotube samples were purified and dried prior to analysis and the solid samples were mounted on a glass slide with double-sided tape. The experiments were performed with four accumulations each with an exposure time of 10 to ensure consistency over each irradiated area of the sample. The data was collected and analyzed with Wire 2.0 software.

Figure 13:
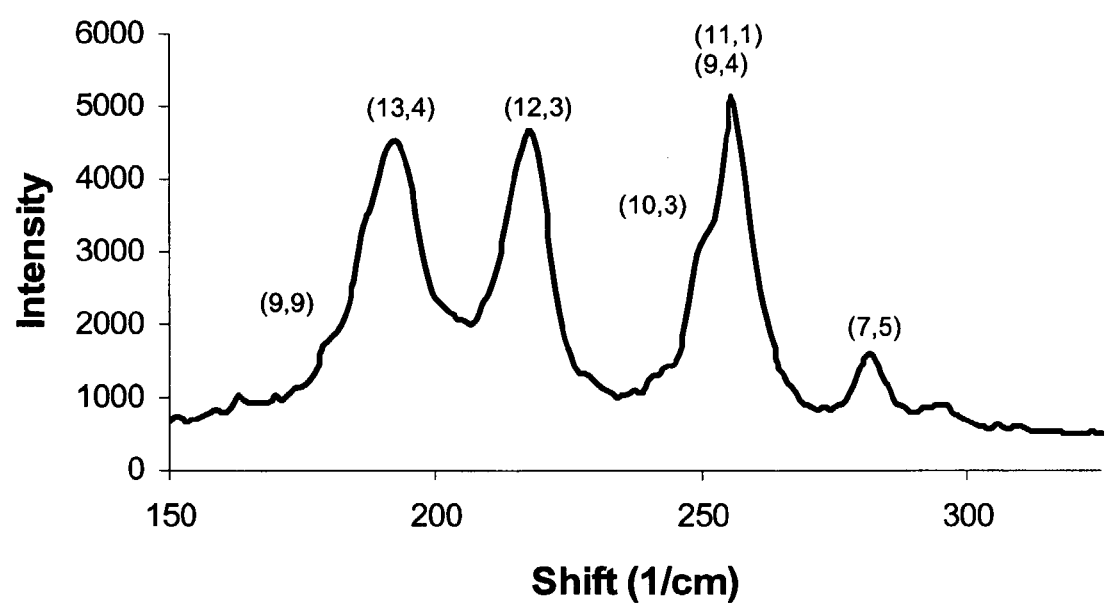
FIG. 13 is a Raman spectrum (633 nm excitation) of the starting SWNTs (prepared from the SDS/SWNTs by flocculation with acetone), where radial breathing modes have been assigned to specific nanotubes.
Figure 14:
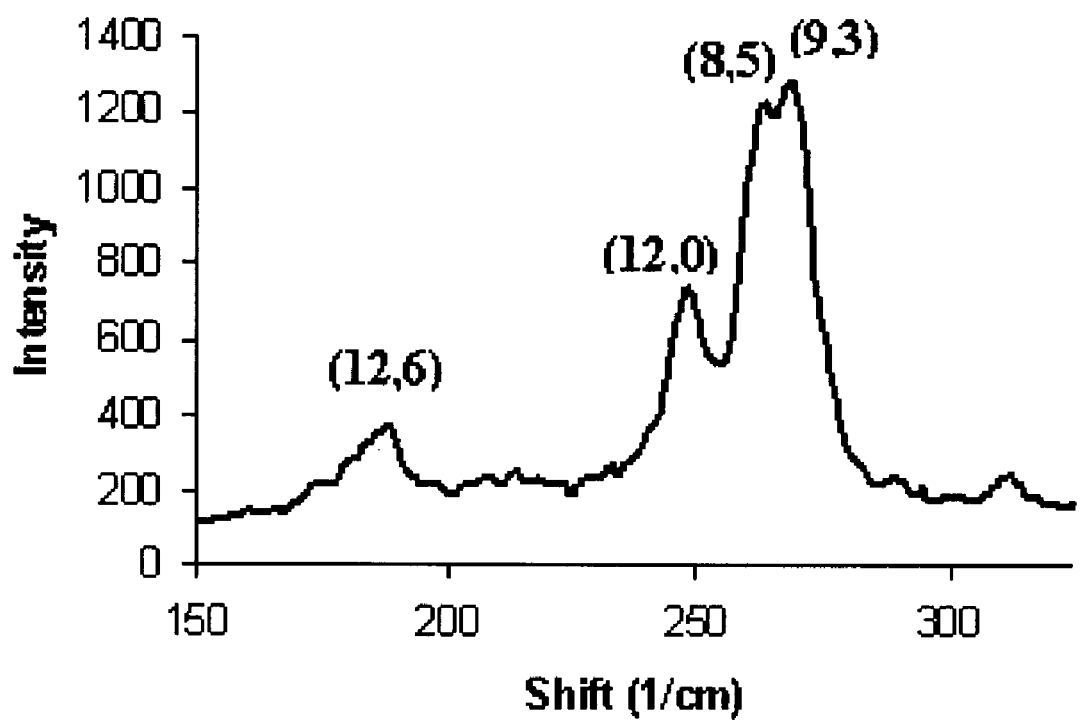
FIG. 14 is a Raman spectrum (514.5 nm excitation) of the starting SWNTs (prepared from the SDS/SWNTs by flocculation with acetone), where radial breathing modes have been assigned to specific nanotubes.
Figure 15:
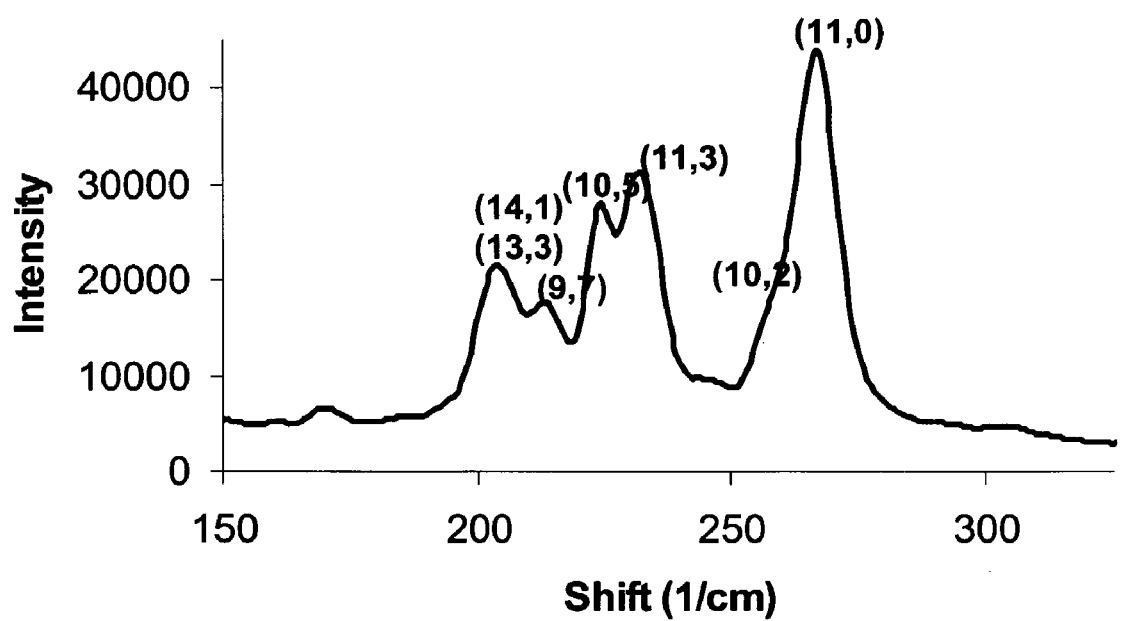
FIG. 15 is a Raman spectrum (780 nm excitation) of the starting SWNTs (prepared from the SDS/SWNTs by flocculation with acetone), where radial breathing modes have been assigned to specific nanotubes.

The resonance Raman enhancement effect for a given nanotube type occurs when the laser excitation wavelength approaches the wavelength of the van Hove singularity of that SWNT. Therefore, any one laser only probes a limited subset of SWNT types. For the purposes of this report, the three excitation wavelengths used to determine the content of the HiPco-derived sample are 514.5, 633, and 780 nm. FIG. 6 shows the three wavelengths of excitation used in relation to the van Hove singularities in the absorption spectra. The line at 630 nm divides the spectra where the transitions to the right correspond to only semiconductors and the first three peaks to the left correspond to only metallics. The 514.5 nm excitation probes only metallics and semi-metallics (and large diameter semiconductors but HiPco tubes have few of these while other sources of SWNTs can show semiconductors at 514.5 nm), the 633 nm excitation probes metallics and semiconductors, and the 780 nm excitation probes only semiconductors. FIG. 13 is a Raman spectrum showing the assigned radial breathing mode region at 633 nm excitation of the starting SWNT/SDS mixture (prepared for Raman analysis by acetone flocculation, filtration and drying), and FIGS. 14 and 15 are 514.5 nm and 780 nm excitations, respectively. The assignment of SWNT chiral vectors (n and m values) from radial breathing mode frequencies observed in the samples is based on the Strano-revised Kataura plot (Strano, *J. Am. Chem. Soc.* 2003, 125, 16148).

Sample Preparation for Raman Analyses.

In cases for the Raman spectra of the starting SWNTs, the materials had been SDS-wrapped, then flocculated from solution with acetone, filtered through PTFE, further acetone-washed to ensure SDS removal, and dried in vacuo. The SWNTs generated from Separation Methods I and II were used directly from the TGA pan (vide supra). The SWNTs generated from thermolysis of I (FIG. 4, Scheme 1, prior to filtration through silica gel) were prepared by flocculating the functionalized SWNT/SDS with acetone, filtering through PTFE, washing with acetone, drying in vacuo and then thermalized in a TGA apparatus and used directly from the TGA pan.

Example 7

Figure 16:
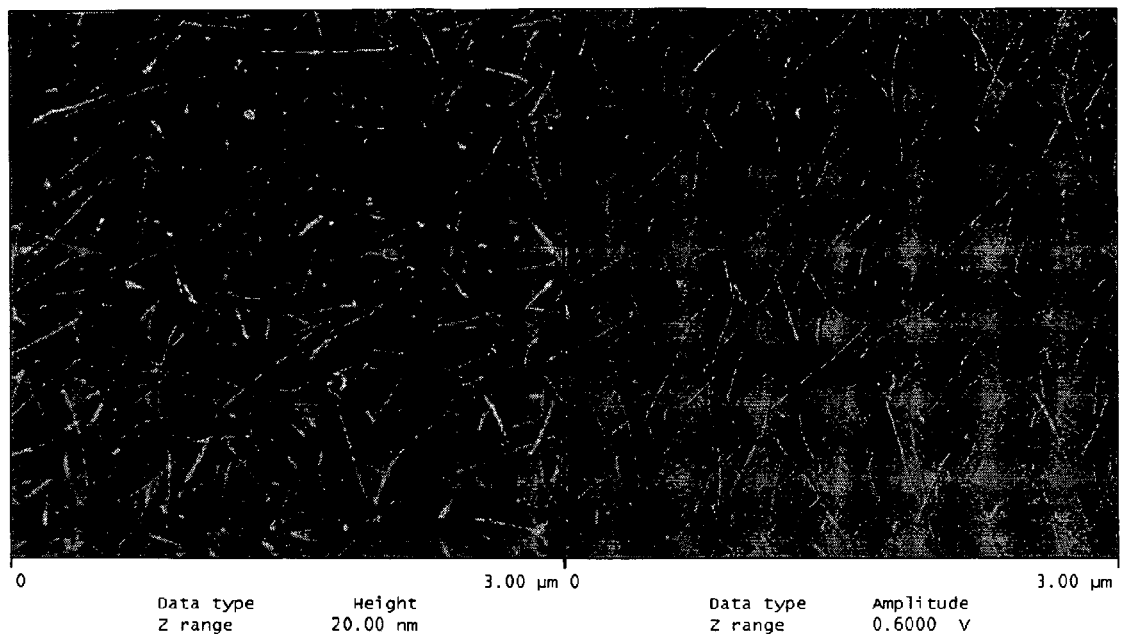
FIG. 16 is an AFM image of the nonpolar component from Separation Method I, obtained by spin-coating a DMF solution onto mica.

This example serves to illustrate AFM and Raman analyses of eluents from Separation Method I, in accordance with embodiments of the present invention AFM analysis, obtained by spin-coating a DMF solution onto mica, of the nonpolar fraction (FIG. 16) from Separation Method I (FIG. 4, Scheme 1), prior to functional group removal upon thermalization, shows a predominance of individual functionalized SWNTs, with a few bundles and no roped SWNTs, in a broad distribution of lengths. This is analogous to what we observed previously from similar functionalization reactions. Therefore, the sample is not separated by length. Furthermore, while there has been speculation that sonication can cut longer SWNTs, the SWNTs that have been obtained from the Rice University HiPco reactors has predominantly been 100-200 nm in length as determined by AFM on functionalized individual SWNTs that had not undergone sonication (Hudson et al., *J. Am. Chem. Soc.* 2004, 126, 11158). Thus the majority of the SWNTs obtained here seem uncut by the sonication process used. While SWNT length will affect affinity to the stationary phase, the diversity of SWNT lengths that are available to us makes it impossible to assess the overall effect of such polydispersity.

Figure 17:
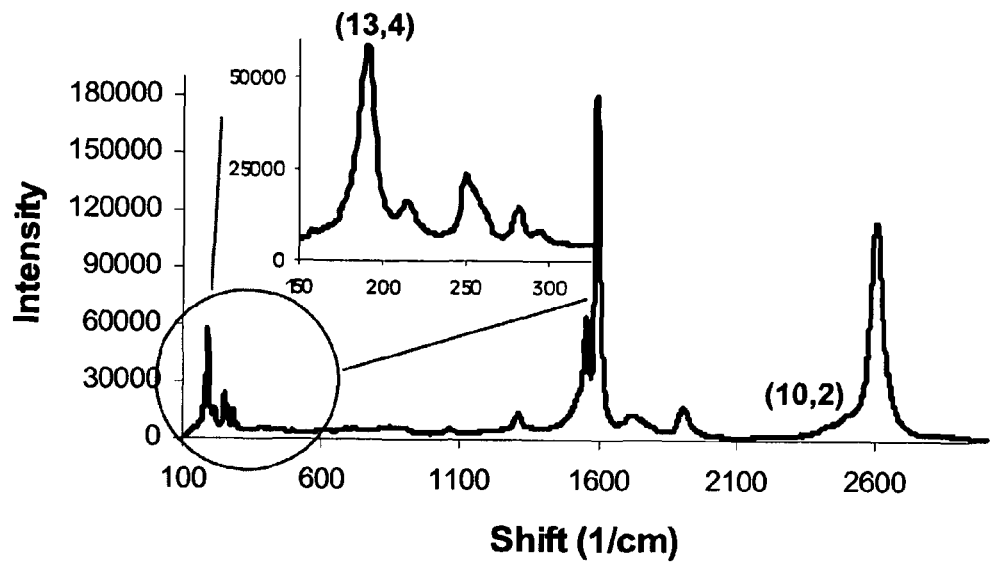
FIG. 17 is a Raman spectrum (633 nm excitation) of the nonpolar, regenerated component from Separation Method I, where the inset depicts the expanded radial breathing mode region.
Figure 18:
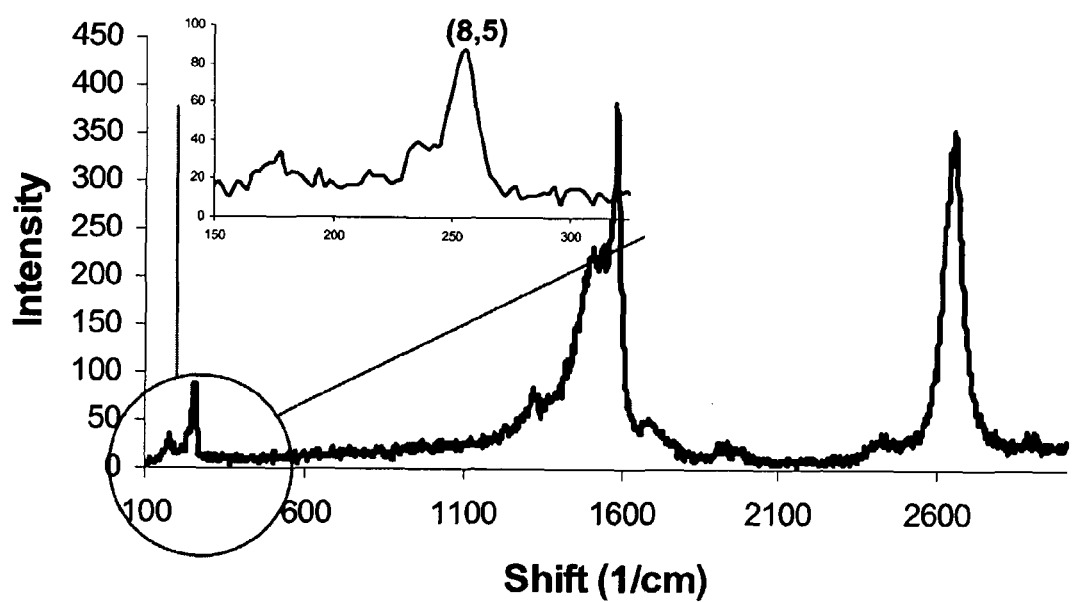
FIG. 18 is a Raman spectrum (514.5 nm excitation) of the nonpolar, regenerated component from Separation Method I, wherein the inset depicts the expanded radial breathing mode region.
Figure 19:
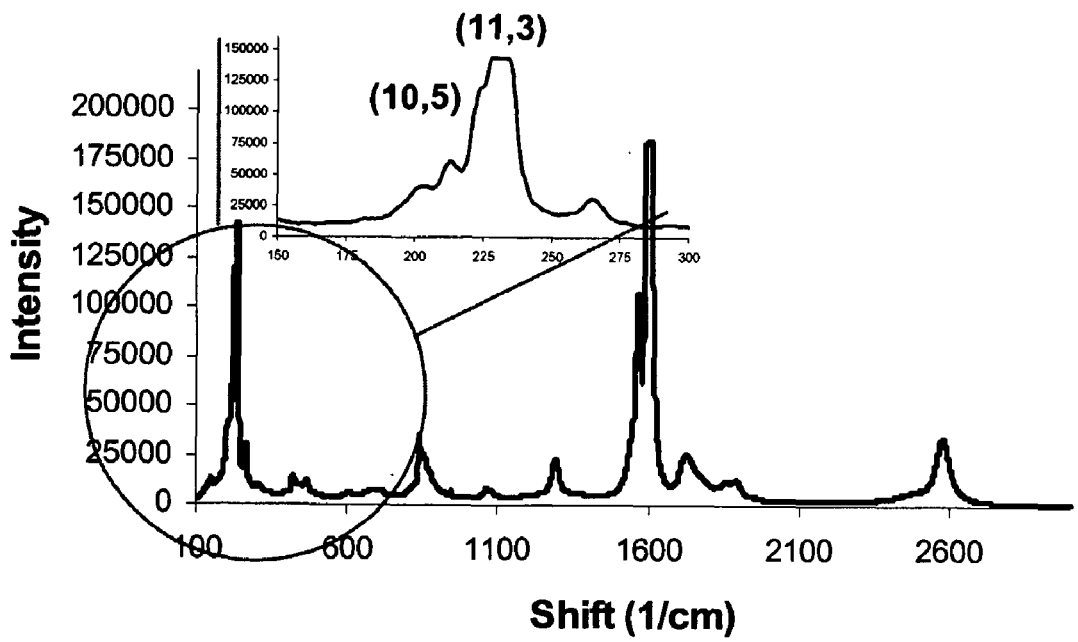
FIG. 19 is a Raman spectrum (780 nm excitation) of the nonpolar, regenerated component from Separation Method I, wherein the inset depicts the expanded radial breathing mode region.

FIGS. 17-19 depict Raman spectra of the nonpolar, regenerated component from Separation Method I, wherein the insets represent the expanded radial breathing mode region, for excitation at 633 nm, 514.5 nm, and 780 nm, respectively. Raman analysis of the component of the heavily functionalized material from Separation Method I is enriched in the (13,4) and the (8,5) species, which are metallics (FIGS. 17 and 18, respectively), but it is also enriched in the (11,3) semiconductor (FIG. 19). Therefore, enrichment of tube-type is indeed apparent in this nonpolar component from Separation Method I, albeit not exclusive in tube type segregation.

Figure 20:
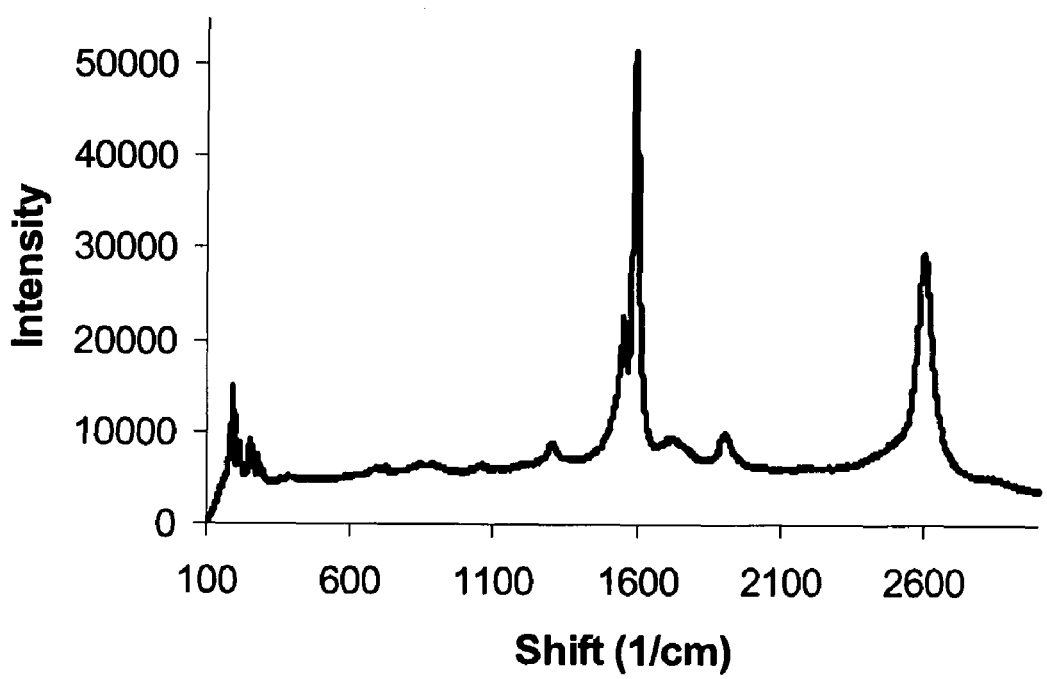
FIG. 20 is a Raman spectrum (633 nm excitation) of the polar component from Separation Method I.
Figure 21:
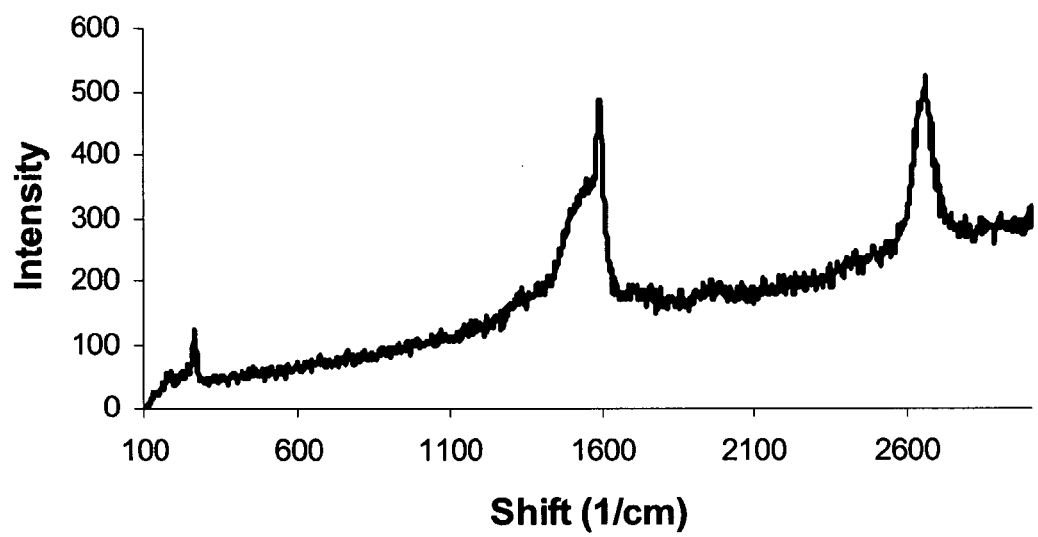
FIG. 21 is a Raman spectrum (514.5 nm excitation) of the polar component from Separation Method I.
Figure 22:
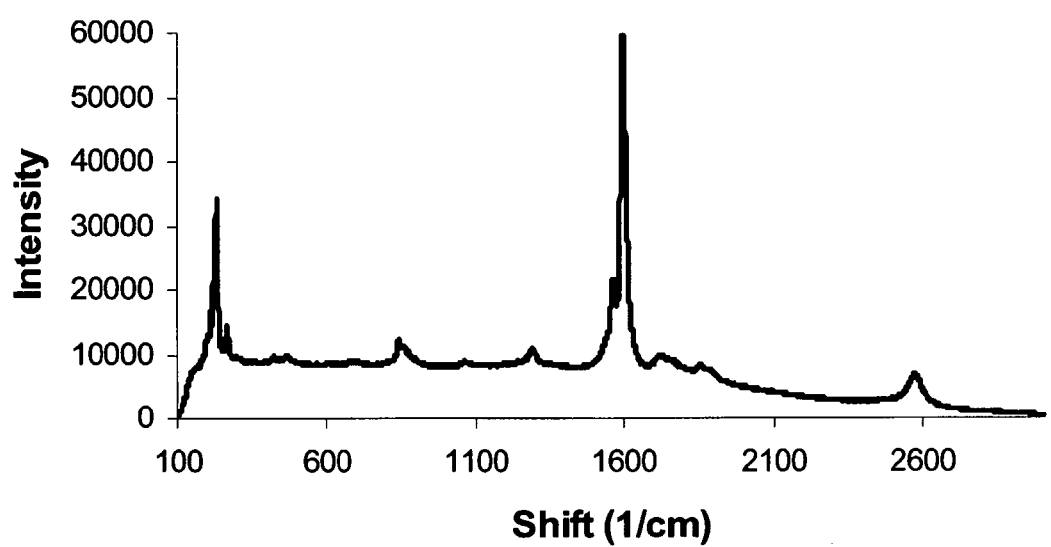
FIG. 22 is a Raman spectrum (780 nm excitation) of the polar component from Separation Method I.
Figure 23:
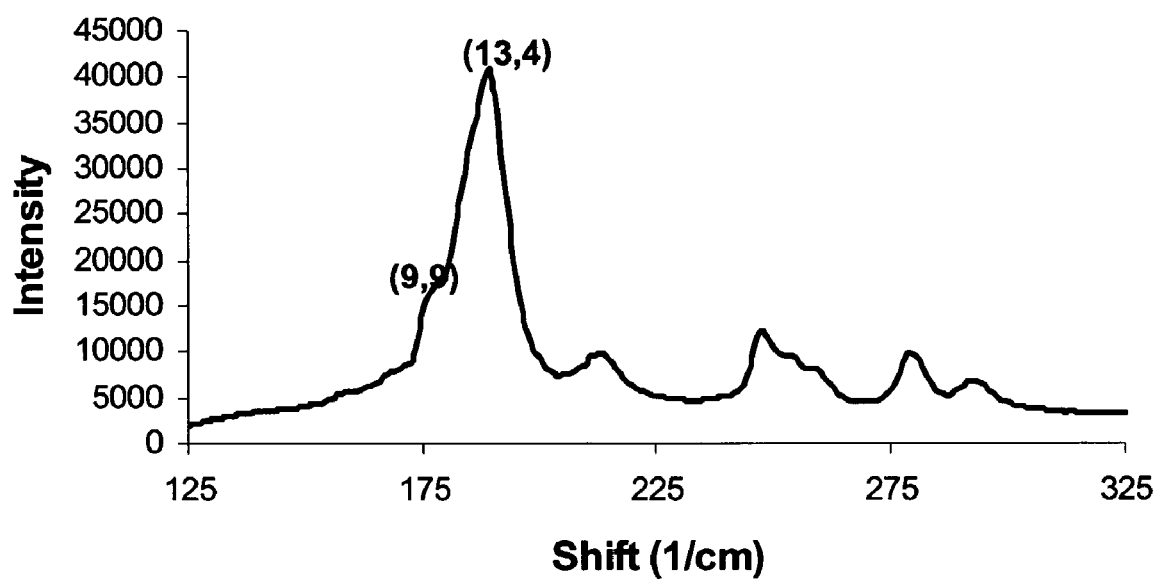
FIG. 23 is a Raman (633 nm excitation) analysis of the nonpolar component enriched in metallics from Separation Method II.
Figure 24:
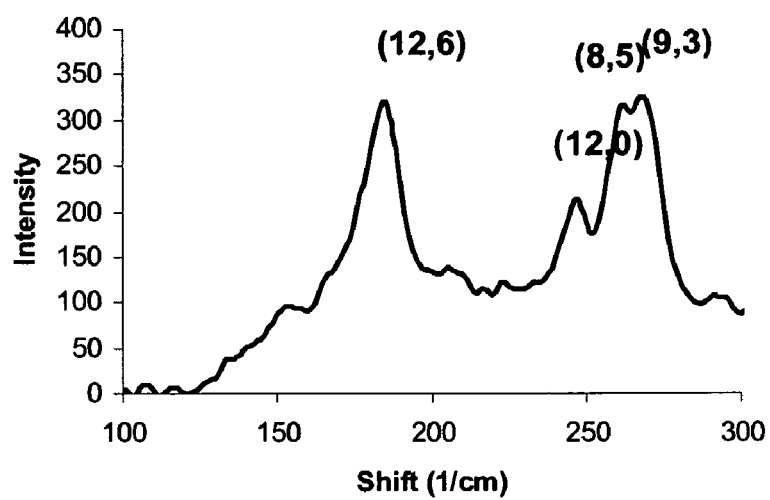
FIG. 24 is a Raman (514.5 nm excitation) analysis of the nonpolar component enriched in metals from Separation Method II.
Figure 25:
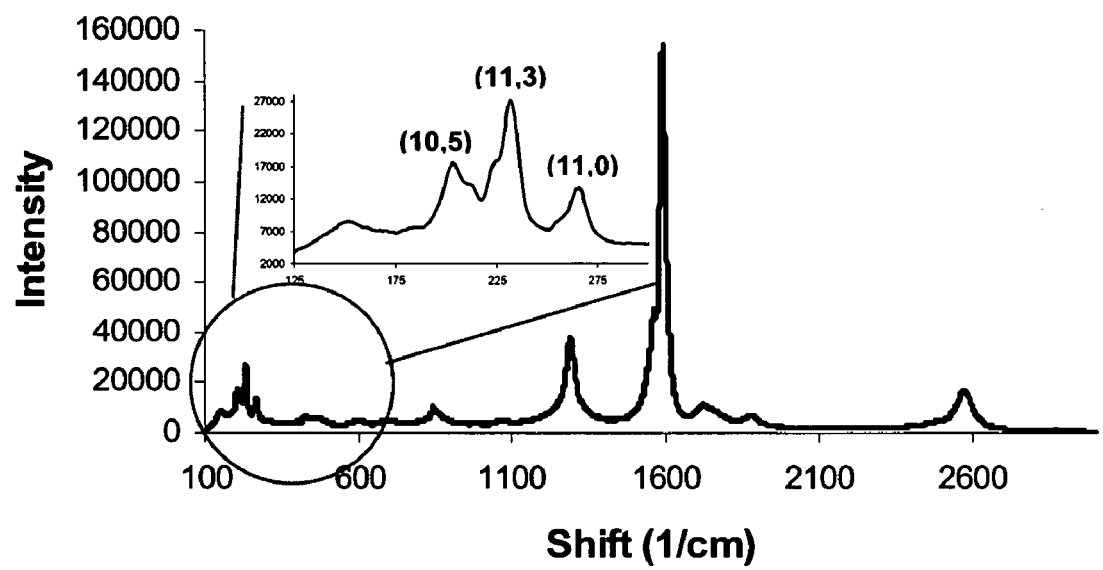
FIG. 25 is a Raman (780 nm excitation) analysis of the nonpolar component from Separation Method II.
Figure 26:
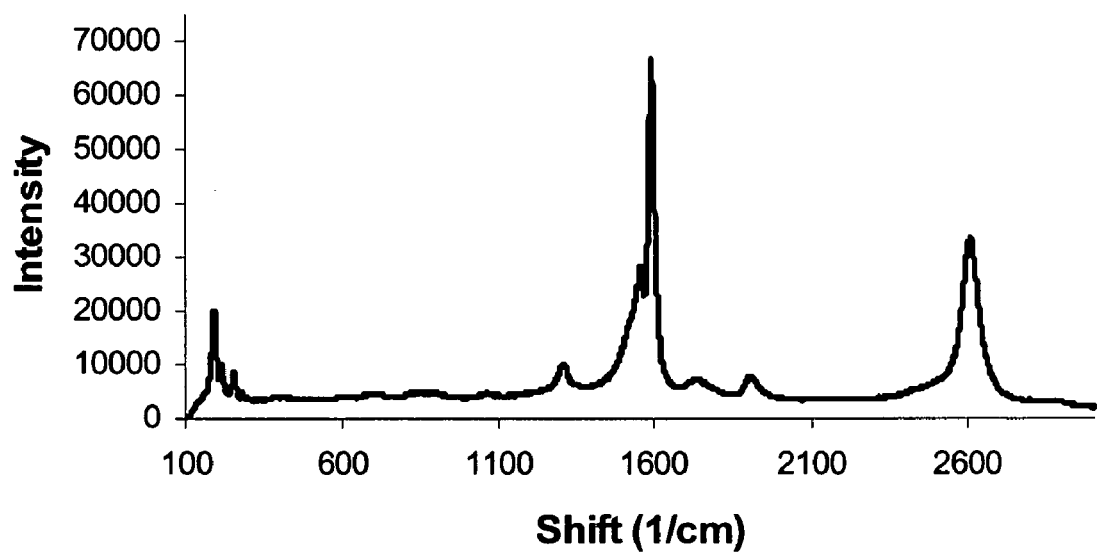
FIG. 26 is a Raman spectrum (633 nm excitation) of the polar component from Separation Method II.
Figure 27:
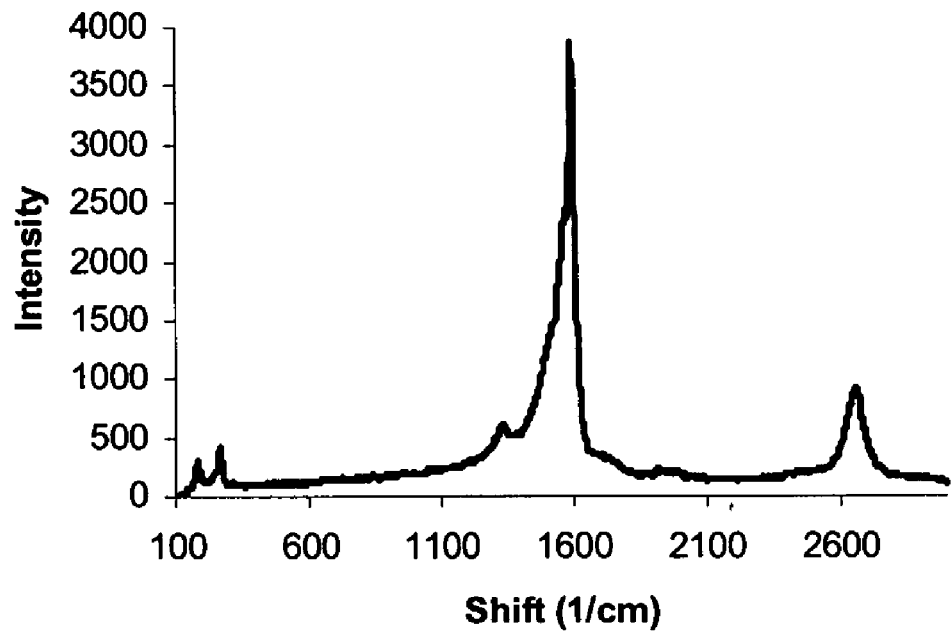
FIG. 27 is a Raman spectrum (514.5 nm excitation) of the polar component from Separation Method II.
Figure 28:
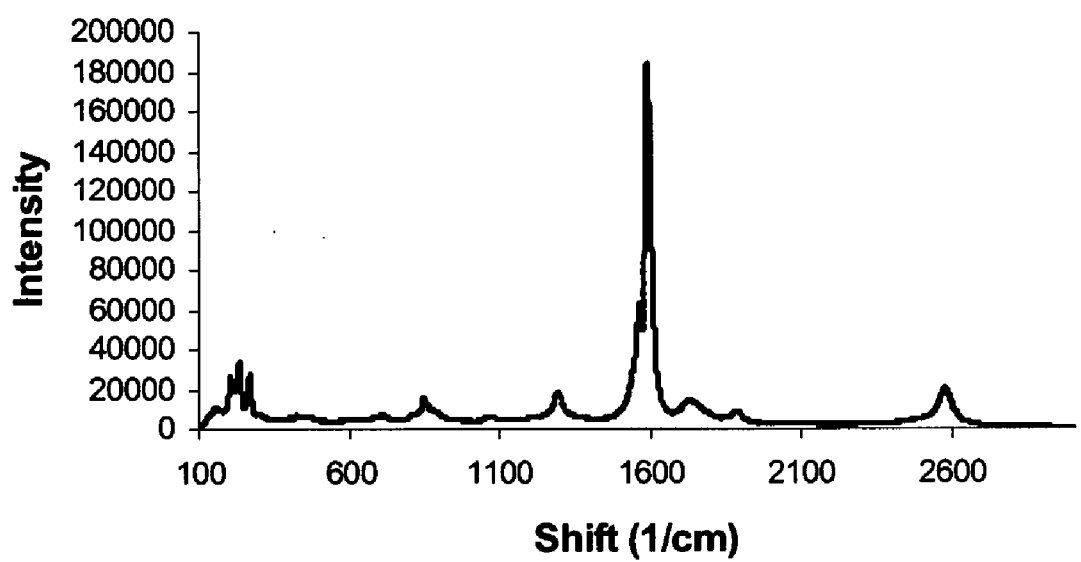
FIG. 28 is a Raman spectrum (780 nm excitation) of the polar component from Separation Method I.

Raman analysis of the polar fraction from Separation Method I at 633, 514.5 and 780 nm excitation (FIGS. 20-22, respectively) showed that the radial breathing mode region is more similar to the spectrum of the starting material than the nonpolar component. The detailed comparison of the radial breathing modes is discussed below.

Example 8

This example serves to illustrate Raman analyses of eluents from Separation Method II, in accordance with embodiments of the present invention.

In an effort to improve upon the results from Separation Method I, the more controlled, but operationally more complex, Separation Method II (FIG. 5, Scheme 2) was conducted. This protocol was devised to allow the polar semiconductors to migrate slower and the nonpolar metals to elute more rapidly from the column with nonpolar solvents as the mobile phase. Both the nonpolar and polar fractions were collected, and the unfunctionalized SWNT structure was regenerated thermally (TGA apparatus) and the two samples were analyzed by Raman spectroscopy (FIGS. 23-28). The 633 nm excitation (FIG. 23) of the nonpolar fraction shows enrichment of the (13,4) metallics. At 514.5 nm (FIG. 24), there was significant enrichment in the (12,6) metallic SWNT, along with the three other metallics (12,0), (8,5) and (9,3). By comparing FIG. 24 to FIG. 18, Separation Method II significantly favors extraction of the (12,6) SWNT into its nonpolar component. Thus Separation Method I is more discriminating in tube type as judged by the 514 nm analysis, but complementary to Separation Method II. Furthermore, the 780 nm excitation analysis (FIG. 25), which probes semiconductors only, shows that there are three semiconductors present in the nonpolar fraction from Separation Method II, namely (10,5), (11,3) and (11,0), similar to the nonpolar fraction from Separation Method I. The semiconductors that are probed by this wavelength are much lower in intensity and have a disorder mode (D-band) larger than all other samples although they were treated by the same thermalization protocol. Thus either these functionalized SWNTs are resistant to defunctionalization or the D-band here does not correspond to the addend sites, but to other defects on the sidewall of the nanotubes. Thus, detailed analysis of the breathing modes at 780 nm excitation for Separation Method II could be complicated due to the large remaining D-band. The polar component that was also analyzed by Raman spectroscopy at three different wavelengths (633 nm, 514.5 nm, and 780 nm—FIGS. 26-28, respectively) is further discussed below in light of the detailed radial breathing mode comparisons.

A side-by-side comparison of the Raman-active radial breathing modes generated from the starting SWNT/SDS that had been flocculated from acetone, and those obtained from Separation Methods I (middle column) and 11 (right column) are shown in composite FIG. 29. This underscores the observation that both Separation Methods provide similar enrichment levels when viewing at 633 nm. At 514.5 nm, the operationally simpler Separation Method I provides a more narrow distribution of SWNT types in favor of the (8,5) metallic while Separation Method II affords more of the (12,6) and (9,3) metallics in addition to the (8,5) metallic. Likewise, at 780 nm, Separation Method I appears more discriminating in favor of the (11,3) semiconductor.

Example 9

This example serves to demonstrate how the interpretation of Raman spectra can be affected by morphology and excitation wavelength.

Figure 30:
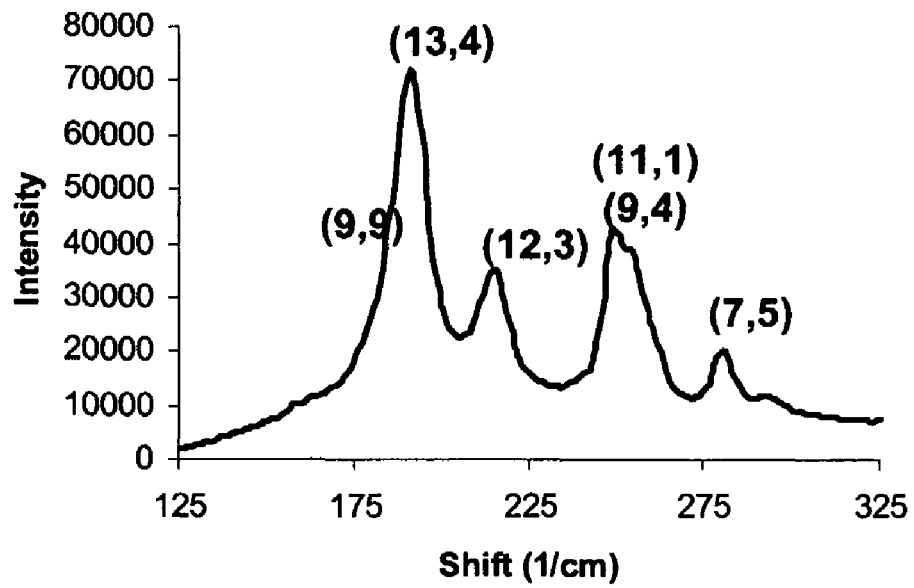
FIG. 30 is a Raman spectrum (633 nm excitation) of the radial breathing modes of the SWNTs that had been regenerated (700° C.) from 1 (Scheme 1, after functionalization with 4-tert-butylphenyl moieties, but prior to filtration through silica gel)
Figure 31:
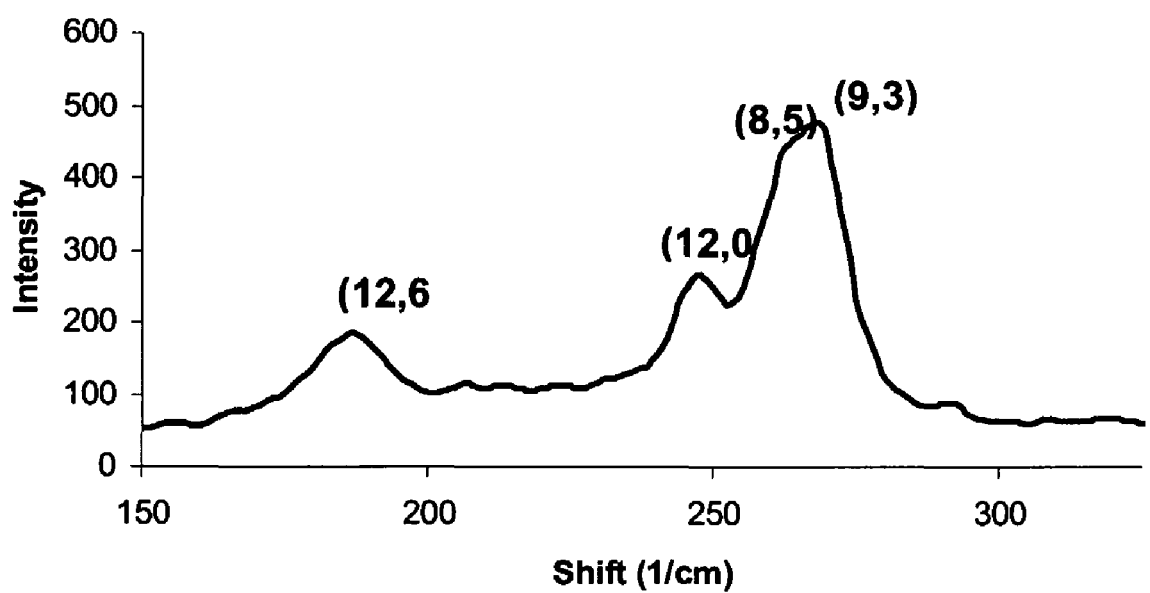
FIG. 31 is a Raman spectrum (514.5 nm excitation) of the radial breathing modes of the SWNTs that had been regenerated (700° C.) from 1 (Scheme 1, after functionalization with 4-tert-butylphenyl moieties, but prior to filtration through silica gel)
Figure 32:
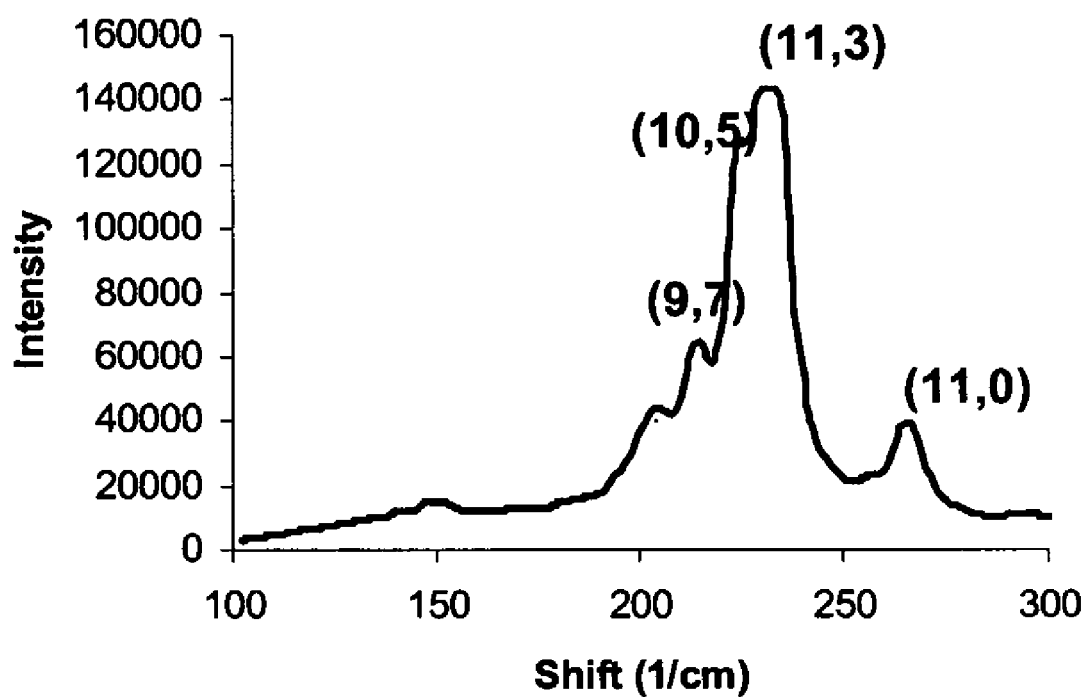
FIG. 32 is a Raman spectrum (780 nm excitation) of the radial breathing modes of the SWNTs that had been regenerated (700° C.) from 1 (Scheme 1, after functionalization with 4-tert-butylphenyl moieties but prior to filtration through silica gel)

Strano and co-workers have recently shown that relative peak intensity changes in Raman spectra can be caused by morphological changes in SWNT bundling (Heller et al., *J. Phys. Chem. B.* 2004, 108, 6905; Baik et al., *J. Phys. Chem. B* 2004, 108, 15560). The relative peak intensity changes can therefore result in a misleading impression of separations. Therefore, in an effort to more accurately compare samples generated by Separation Methods I and II against compounds regenerated from a TGA apparatus, a sample of 1, heavily functionalized SWNTs prepared according to Scheme 1 but prior to filtration through silica gel, was taken and subjected to SDS and solvent removal and then addend cleavage at 700° C., followed by recording of the Raman spectra from the material generated in the TGA pan. The radial breathing modes at 633, 514.5 and 780 nm are shown in FIGS. 30-32, respectively. Interestingly, when comparing FIGS. 30-32 with the spectra in FIG. 29, column 1, there are noticeable differences that could indeed be morphologically based rather than intrinsic to differing SWNT (n, m) compositions.

Figure 33:
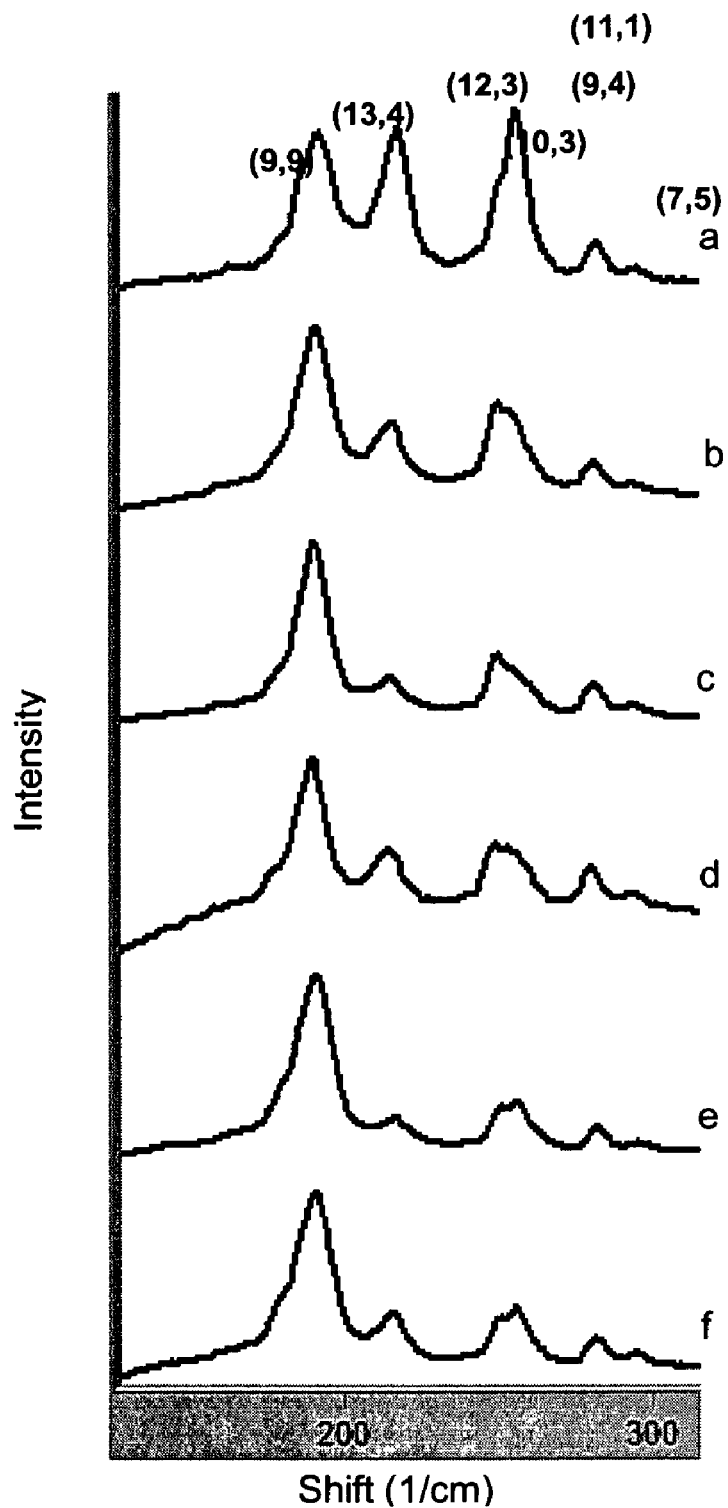
FIG. 33 depicts, comparatively, stacked plots of the Raman (633 nm excitation) spectra of the radial breathing modes of (a) SWNT/SDS flocculated with acetone, filtered through PTFE, washed with acetone, and dried in vacuo, (b) the SWNTs that had been regenerated (700° C.) from 1 in a TGA pan, (c) nonpolar component of Separation Method I regenerated (700° C.) in a TGA pan, (d) polar component of Separation Method I regenerated (700° C.) in a TGA pan, (e) nonpolar component of Separation Method II regenerated (700° C.) in a TGA pan, and (f) polar component of Separation Method II regenerated (700° C.) in a TGA pan, where the peak intensities are in arbitrary units and only relatively comparable within a single trace.
Figure 34:
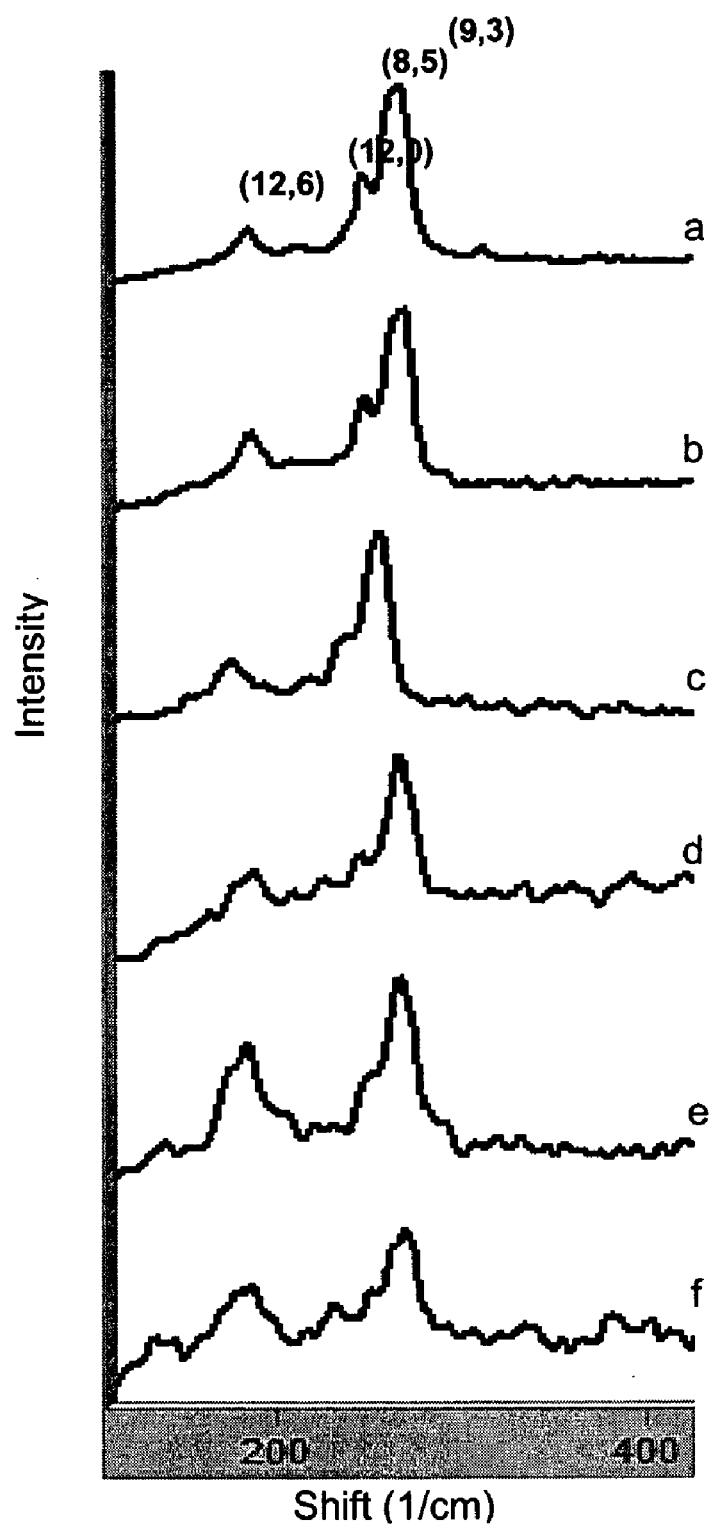
FIG. 34 depicts, comparatively, stacked plots of the Raman (514.5 nm excitation) spectra of the radial breathing modes of (a) SWNT/SDS flocculated with acetone, filtered through PTFE, washed with acetone, and dried in vacuo, (b) the SWNTs that had been regenerated (700° C.) from 1 in a TGA pan, (c) nonpolar component of Separation Method I regenerated (700° C.) in a TGA pan, (d) polar component of Separation Method I regenerated (700° C.) in a TGA pan, (e) nonpolar component of Separation Method II regenerated (700° C.) in a TGA pan, and (f) polar component of Separation Method II regenerated (700° C.) in a TGA pan, where the peak intensities are in arbitrary units and only relatively comparable within a single trace.
Figure 35:
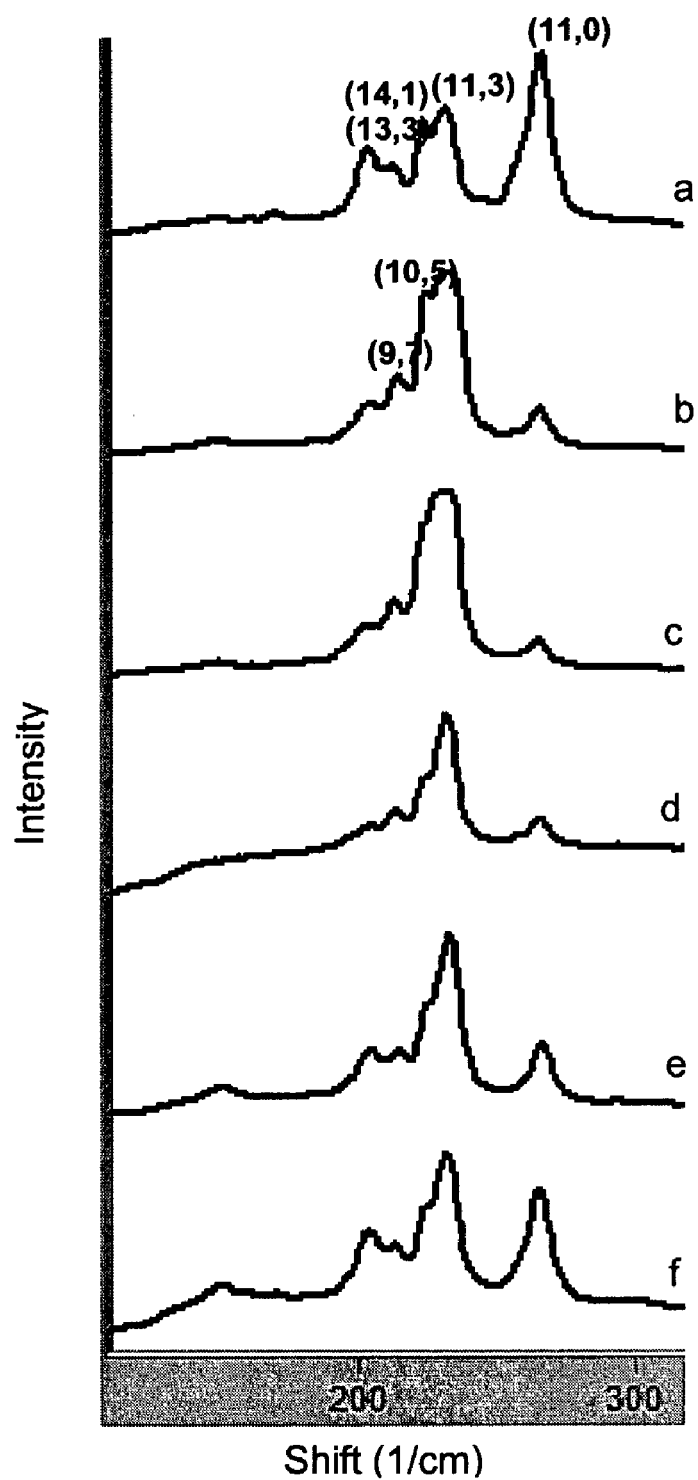
FIG. 35 depicts, comparatively, stacked plots of the Raman (780 nm excitation) spectra of the radial breathing modes of (a) SWNT/SDS flocculated with acetone, filtered through PTFE, washed with acetone, and dried in vacuo, (b) the SWNTs that had been regenerated (700° C.) from 1 in a TGA pan, (c) nonpolar component of Separation Method I regenerated (700° C.) in a TGA pan, (d) polar component of Separation Method I regenerated (700° C.) in a TGA pan, (e) nonpolar component of Separation Method II regenerated (700° C.) in a TGA pan, and (f) polar component of Separation Method II regenerated (700° C.) in a TGA pan, wherein the peak intensities are in arbitrary units and only relatively comparable within a single trace.

Final composite stacked plots of electronically standardized radial breathing mode data for all of the spectra in this paper are shown in FIGS. 33-35 at 633, 514.5 and 780 nm excitation wavelengths, respectively. FIG. 33 depicts a comparitive stacked plot of the Raman (633 nm excitation) spectra of the radial breathing modes of (a) SWNT/SDS flocculated with acetone, filtered through PTFE, washed with acetone, and dried in vacuo, (b) the SWNTs that had been regenerated (700° C.) from 1 in a TGA pan, (c) nonpolar component of Separation Method I regenerated (700° C.) in a TGA pan, (d) polar component of Separation Method I regenerated (700° C.) in a TGA pan, (e) nonpolar component of Separation Method II regenerated (700° C.) in a TGA pan, and (f) polar component of Separation Method II regenerated (700° C.) in a TGA pan. The peak intensities are in arbitrary units and only relatively comparable within a single trace. FIG. 34 depicts a comparison stacked plots of the Raman (514.5 nm excitation) spectra of the radial breathing modes of (a) SWNT/SDS flocculated with acetone, filtered through PTFE, washed with acetone, and dried in vacuo, (b) the SWNTs that had been regenerated (700° C.) from 1 in a TGA pan, (c) nonpolar component of Separation Method I regenerated (700° C.) in a TGA pan, (d) polar component of Separation Method I regenerated (700° C.) in a TGA pan, (e) nonpolar component of Separation Method II regenerated (700° C.) in a TGA pan, and (f) polar component of Separation Method II regenerated (700° C.) in a TGA pan. The peak intensities are in arbitrary units and only relatively comparable within a single trace. FIG. 35 depicts comparison stacked plots of the Raman (780 nm excitation) spectra of the radial breathing modes of (a) SWNT/SDS flocculated with acetone, filtered through PTFE, washed with acetone, and dried in vacuo, (b) the SWNTs that had been regenerated (700° C.) from 1 in a TGA pan, (c) nonpolar component of Separation Method I regenerated (700° C.) in a TGA pan, (d) polar component of Separation Method I regenerated (700° C.) in a TGA pan, (e) nonpolar component of Separation Method II regenerated (700° C.) in a TGA pan, and (f) polar component of Separation Method II regenerated (700° C.) in a TGA pan. The peak intensities are in arbitrary units and only relatively comparable within a single trace.

There were indeed some changes in relative peak heights between the Raman spectra of the functionalized/thermally defunctionalized samples derived from 1 and those of the starting SWNT/SDS samples that had been acetone-flocculated and washed. This difference is apparent at 633 nm (comparing relative intensities in FIG. 33, e.g., Trace a to Trace b) and 780 nm (comparing FIG. 35a with 35b). For example, at 633 nm (FIGS. 33a and 33b), signals for the (11,1) and (9,4) are greatly reduced in the thermally treated material. Likewise at 780 nm (FIGS. 35a and 35b), there is a large suppression of the (11,0) band in the thermally treated SWNTs. Interestingly, the morphological differences are not as noticeable at 514.5 nm (comparing FIG. 34a with FIG. 34b), thus emphasizing the need to probe the Raman excitations at multiple wavelengths.

At 633 nm (FIG. 33), the most noticeable difference is the decline in intensity of the (11,1) and (9,4) semiconductors relative to the metallics in the sample. Likewise, the polar and nonpolar fractions from both Separation Methods I and II appeared reasonable similar. At 514.5 nm (FIG. 34), Separation Method I is clearly superior to Separation Method II in separating the (12,6) metallic SWNTs from the (8,5) SWNTs. The polar and nonpolar fraction from Separation Method I are also similar. At 780 nm (FIG. 35), there is a clear difference between Separation Methods I and II with respect to removal of the (11,0) SWNT and the segregations between the (10,5) and (11,3) bands.

In total, upon comparing the spectra derived from 1 and the spectra derived from Separation Methods I and II at multiple excitation wavelengths, the morphological changes alone are not sufficient to account for the relative peak changes noted in our filtration-enriched samples generated here. Indeed, some modest enrichment had occurred in the silica gel-filtration protocols, albeit not as pronounced as one would have been led to believe from a comparison of the flocculated SWNTs to the thermally regenerated SWNTs from Separation Methods I and II.

Example 10

In the preceding Examples, SWNTs were individualized in water using a surfactant dispersal agent (e.g., sodium dodecyl sulfate, SDS), then functionalized. After functionalization, the surfactant was removed (washed) from the functionalized SWNTs. Such surfactant, or other dispersal agent, need not be removed after functionalization, however. Indeed, such dispersal agents can be employed to effect separation of CNTs by regardless of whether the CNTs have been functionalized, as described in this Example.

Because of the solubility difficulties associated with SWNTs, such material is typically best manipulated using surfactant wrapped (encapsulated) "decant" solutions. See, e.g., O'Connell et al., *Science,* 2002, 297, 593; Strano et al., *J. Nanosci. Nanotech.* 2003, 3, 81; and Moore et al., *Nano Lett.,* 2003, 3, 1379. The surfactant is able to individualize the nanotubes in solution by overcoming the strong van der Waals interactions between the SWNT sidewalls, thereby preventing re-bundling and re-roping, and making separation more likely.

As an example of how one might utilize chromatography to effect separation of such individualized SWNTs by bandgap, a chromatography column 24 inches in length and 1 inch in diameter can be prepared by dry loading silica gel (e.g., grade 60, 230-400 mesh) into the column to be employed as the stationary phase, with subsequent wetting with a 1% SDS/$H_2O$ solution. Then, 5 mL of unfunctionalized SWNT decant (from a CNT/SDS/$H_2O$ solution) can be added to the top of the column, and followed by eluting with 1% SDS/$H_2O$ solution. Wherein the surfactant wrapped SWNTs interact differentially with the stationary phase (possibly as a result of functional moieties on the stationary phase) the SWNTs will likely move as a band through the column, the band broadening on the way down. Collection of fractions as the broadened band elutes yields separation wherein the fractions are enriched in SWNTs of a particular type.

In summary, the present invention is directed the separation of CNTs by type, and typically in bulk quantities, by selectively functionalizing the different nanotubes types within a mixture so as to impart these different nanotube types with functional groups of differing chemical properties to as to be able to separate them, based on such properties, using chromatographic means.

All patents and publications referenced herein are hereby incorporated by reference. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A method for separating CNTs by type, the method comprising the steps of:
   a) dispersing a plurality of CNTs of different type as individual nanotubes in a solvent to form a first mixture;
   b) selectively-functionalizing metallic and semi-metallic CNTs within the first mixture using a first diazonium species, in sub-stoichiometric amount, to yield a second mixture comprising selectively-functionalized metallic and semi-metallic CNTs and unfunctionalized semiconducting CNTs;
   c) reacting the CNTs in the second mixture with a second diazonium species to yield a third mixture comprising differentially-functionalized metallic and semi-metallic CNTs possessing a first chemical property and functionalized semiconducting CNTs possessing a second chemical property; and
   d) performing at least one chromatographic separation on the third mixture, so as to separate the differentially-functionalized metallic and semi-metallic CNTs from the functionalized semiconducting CNTs on the basis of their functionalization-induced differential chemical properties.

2. The method of claim 1, wherein the CNTs are individually dispersed in a surfactant solution.

3. The method of claim 1, wherein the CNTs are individually dispersed in an aqueous surfactant solution.

4. The method of claim 1, wherein the CNTs are individually dispersed in a superacid media.

5. The method of claim 4, wherein the superacid media is oleum.

6. The method of claim 1, wherein the CNTs are selected from the group consisting of SWNTs, MWNTs, double-wall carbon nanotubes, and combinations thereof.

7. The method of claim 1, wherein either of the first or second diazonium species is a diazonium salt.

8. The method of claim 1, wherein either of the first or second diazonium species is formed in situ from a substituted aniline and an alkyl nitrite.

9. The method of claim 1, wherein the first chemical property imparts the differentially-functionalized metallic and semi-metallic CNTs with greater affinity for a stationary phase, in the step of chromatographically-separating, relative to the functionalized semiconducting CNTs that possess a greater affinity for a mobile phase.

10. The method of claim 1, wherein the first chemical property imparts the differentially-functionalized metallic and semi-metallic CNTs with greater affinity for a mobile phase, in the step of chromatographically-separating, relative to the functionalized semiconducting CNTs that possess a greater affinity for a stationary phase.

11. The method of claim 1, wherein flash chromatography is used for at least one of the at least once-performed chromatographic separations.

12. The method of claim 1, wherein the method provides for bulk quantities of CNTs of a given type.

13. The method of claim 1, wherein the method provides for bulk quantities of mixtures concentrated in a given type of CNT.

14. A method for separating CNTs by type, the method comprising the steps of:
   a) dispersing a plurality of CNTs of different type as individual nanotubes in a solvent to form a first mixture;
   b) differentially-functionalizing the CNTs within the mixture with at least two, different diazonium species to form a second mixture comprising functionalized metallic and semi-metallic CNTs and functionalized semiconducting CNTs, wherein the functionalized metallic and semi-metallic CNTs within the mixture comprise a functionalization-induced chemical property that renders them chemically distinct from the functionalized semiconducting CNTs within the second mixture; and
   c) chromatographically-separating the functionalized metallic and semi-metallic CNTs from the functionalized semiconducting CNTs on the basis of this chemical property.

15. The method of claim 14, wherein the CNTs are individually dispersed in a surfactant solution.

16. The method of claim 14, wherein the CNTs are individually dispersed in an aqueous surfactant solution.

17. The method of claim 14, wherein the CNTs are individually dispersed in a superacid media.

18. The method of claim 17, wherein the superacid media is oleum.

19. The method of claim 14, wherein the CNTs are selected from the group consisting of SWNTs, MWNTs, double-wall carbon nanotubes, and combinations thereof.

20. The method of claim 14, wherein the diazonium species is a diazonium salt.

21. The method of claim 14, wherein the diazonium species is formed in situ from a substituted aniline and an alkyl nitrite.

22. The method of claim 14, wherein the metallic and semi-metallic CNTs are differentially-functionalized so as to have greater affinity for a stationary phase, in the step of chromatographically-separating, relative to the functionalized semiconducting CNTs.

23. The method of claim 14, wherein the metallic and semi-metallic CNTs are differentially-functionalized so as to have greater affinity for a mobile phase, in the step of chromatographically-separating, relative to the functionalized semiconducting CNTs.

24. The method of claim 14, wherein flash chromatography is used for at least one of the chromatographic separations.

25. The method of claim 14, wherein the method provides for bulk quantities of CNTs of a given type.

26. The method of claim 14, wherein the method provides for bulk quantities of mixtures concentrated in a given type of CNT.

27. A method for separating CNTs by type, the method comprising the steps of:
   a) dispersing a plurality of CNTs as individual nanotubes in a solvent to form a first mixture, wherein the first mixture comprises CNTs of a first type and a second type;
   b) adding to the first mixture a substoichiometric amount of a first reactive species to selectively-functionalize CNTs of the first type to yield a second mixture comprising functionalized CNTs of a first type and unfunctionalized CNTs of a second type;
   c) adding to the second mixture a second reactive species to functionalize CNTs of the second type and form a third mixture comprising functionalized CNTs of a first type and functionalized CNTs of a second type, wherein the functionalized CNTs of the first type comprise a functionalization-induced chemical property that renders them chemically separable from the functionalized CNTs of the second type; and d) separating the functionalized CNTs of the first type from the functionalized CNTs of the second type on the basis of this chemical property.

28. The method of claim 27, wherein the CNTs of the first type are selected from the group consisting of metallic CNTs, semi-metallic CNTs, and combinations thereof, and wherein the CNTs of the second type are semiconducting CNTs.

29. The method of claim 27, wherein the CNTs of the first type are semiconducting CNTs, and wherein the CNTs of the second type are selected from the group consisting of metallic CNTs, semi-metallic CNTs, and combinations thereof.

30. The method of claim 27, wherein one or both of the first and second reactive species are diazonium species.

31. The method of claim 27, wherein the chemical property is an extractability into a particular solvent.

32. The method of claim 27, wherein the chemical property is an affinity for polar solvents.

33. The method of claim 27, wherein the chemical property is an affinity for non-polar solvents.

34. The method of claim 27, wherein the step of separating involves an extraction technique.

35. The method of claim 27, wherein the step of separating involves a chromatographic technique.

36. The method of claim 35, wherein the chromatographic technique is column chromatography.

37. The method of claim 35, wherein the chromatographic technique comprises a stationary phase selected from the group consisting of silica gel, alumina, Florisil, and combinations thereof.

38. The method of claim 35, wherein the chromatographic technique involves the use of Fluoro-phase columns.

39. The method of claim 35, wherein the chromatographic technique comprises a metal-impregnated stationary phase.

40. The method of claim 39, wherein the stationary phase is impregnated with silver.

41. A method for separating CNTs by type, the method comprising the steps of:
   a) dispersing a plurality of CNTs as individual nanotubes in a solvent to form a first mixture, wherein the first mixture comprises CNTs of a first type and a second type;
   b) differentially-functionalizing the CNTs within the mixture with at least two, different reactive species to form a second mixture comprising functionalized CNTs of a first type and functionalized CNTs of a second type, wherein the functionalized CNTs of the first type within the second mixture comprise a functionalization-induced chemical property that renders them chemically separable from the functionalized CNTs of the second type within the second mixture; and
   c) separating the functionalized CNTs of the first type from the functionalized CNTs of the second type on the basis of this chemical property.

42. The method of claim 41, wherein the CNTs of the first type are selected from the group consisting of metallic CNTs, semi-metallic CNTs, and combinations thereof, and wherein the CNTs of the second type are semiconducting CNTs.

43. The method of claim 41, wherein one or both of the first and second reactive species are diazonium species.

44. The method of claim 41, wherein the chemical property is an affinity for polar solvents.

45. The method of claim 41, wherein the chemical property is an affinity for non-polar solvents.

46. The method of claim 41, wherein the step of separating involves a chromatographic technique.

47. A method for separating CNTs by type, the method comprising the steps of:
   a) dispersing a plurality of CNTs as individual nanotubes in a solvent to form a first mixture, wherein the first mixture comprises CNTs of a first type and a second type;
   b) reacting the first type of nanotubes within the first mixture with a first reactive species to form a second mixture;
   c) reacting the second type of nanotubes within the second mixture with a second reactive species to form a third mixture, the third mixture comprising functionalized nanotubes of a first type and functionalized nanotubes of a second type, wherein the functionalized nanotubes of the first type have a functionalization-induced chemical property that renders them chemically separable from the functionalized nanotubes of the second type; and
   d) separating the functionalized nanotubes of the first type from the functionalized nanotubes of the second type on the basis of the functionalization-induced chemical property.

48. The method of claim 47, wherein the CNTs of the first type are selected from the group consisting of metallic CNTs, semi-metallic CNTs, and combinations thereof, and wherein the CNTs of the second type are semiconducting CNTs.

49. The method of claim 47, wherein one or both of the first and second reactive species are diazonium species.

50. The method of claim 47, wherein the chemical property is an affinity for polar solvents.

51. The method of claim 47, wherein the chemical property is an affinity for non-polar solvents.

* * * * *